United States Patent
Head

(10) Patent No.: US 11,613,833 B1
(45) Date of Patent: *Mar. 28, 2023

(54) BRAIDED STRUCTURES OF COMPLEX GEOMETRY

(71) Applicant: A&P Technology, Inc., Cincinnati, OH (US)

(72) Inventor: Andrew A. Head, Cincinnati, OH (US)

(73) Assignee: A&P TECHNOLOGY, INC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,890

(22) Filed: Nov. 9, 2021

Related U.S. Application Data

(63) Continuation-in-part of application No. 15/929,761, filed on May 20, 2020, now abandoned, which is a continuation of application No. 16/259,236, filed on Jan. 28, 2019, now abandoned, which is a continuation of application No. 15/811,435, filed on Nov. 13, 2017, now abandoned, which is a continuation of application No. 15/089,548, filed on Apr. 2, 2016, now Pat. No. 9,816,210.

(60) Provisional application No. 62/142,603, filed on Apr. 3, 2015.

(51) Int. Cl.
| | |
|---|---|
| *D04C 1/06* | (2006.01) |
| *B32B 1/02* | (2006.01) |
| *B32B 5/02* | (2006.01) |
| *B32B 1/08* | (2006.01) |
| *D04C 3/38* | (2006.01) |
| *D04C 3/24* | (2006.01) |

(52) U.S. Cl.
CPC ............... *D04C 1/06* (2013.01); *B32B 1/02* (2013.01); *B32B 1/08* (2013.01); *B32B 5/02* (2013.01); *D04C 3/24* (2013.01); *D04C 3/38* (2013.01); *B32B 2439/00* (2013.01); *B32B 2597/00* (2013.01)

(58) Field of Classification Search
CPC .... D04C 1/06; D04C 3/24; D04C 3/38; B32B 1/02; B32B 1/08; B32B 5/02; B32B 2439/00; B32B 2597/00
See application file for complete search history.

*Primary Examiner* — Michael C Miggins
(74) *Attorney, Agent, or Firm* — FisherBroyles, LLP; Jeremy P. Sanders

(57) ABSTRACT

A braided sleeve is formed having complex geometry, including multiple geometries along the braided sleeve's longitudinal axis. In particular, along a first portion of the braided sleeve's longitudinal axis, multiple tows are intertwined with each other. Along a second portion, at least one of the tows is removed from being intertwined with the other tows and is relocated to an interior or an exterior of the braided sleeve. A third portion of the braded sleeve along the longitudinal axis includes the removed tow being intertwined with the plurality of tows again. In this manner, the braided sleeve may provide coverage of preforms with varying diameters along the longitudinal axis of the preforms.

18 Claims, 30 Drawing Sheets

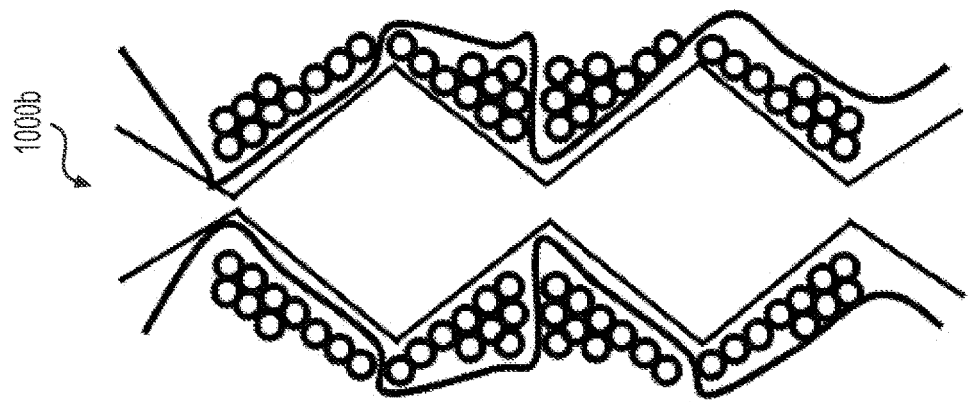
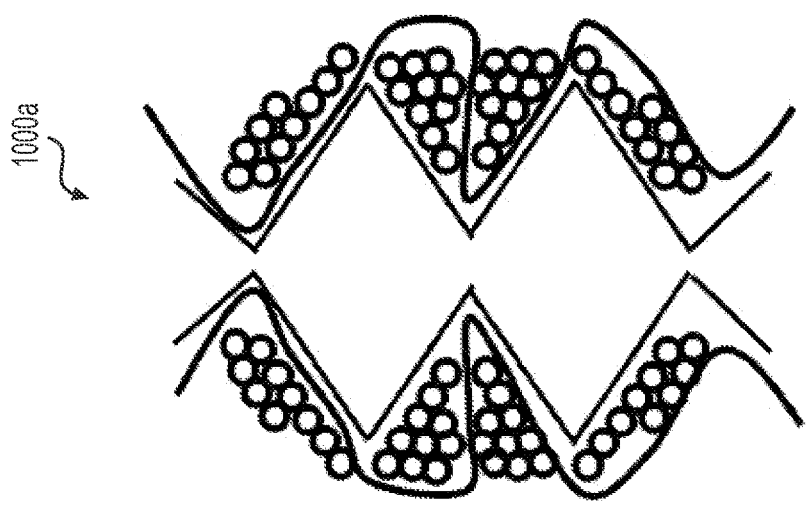
FIG. 10

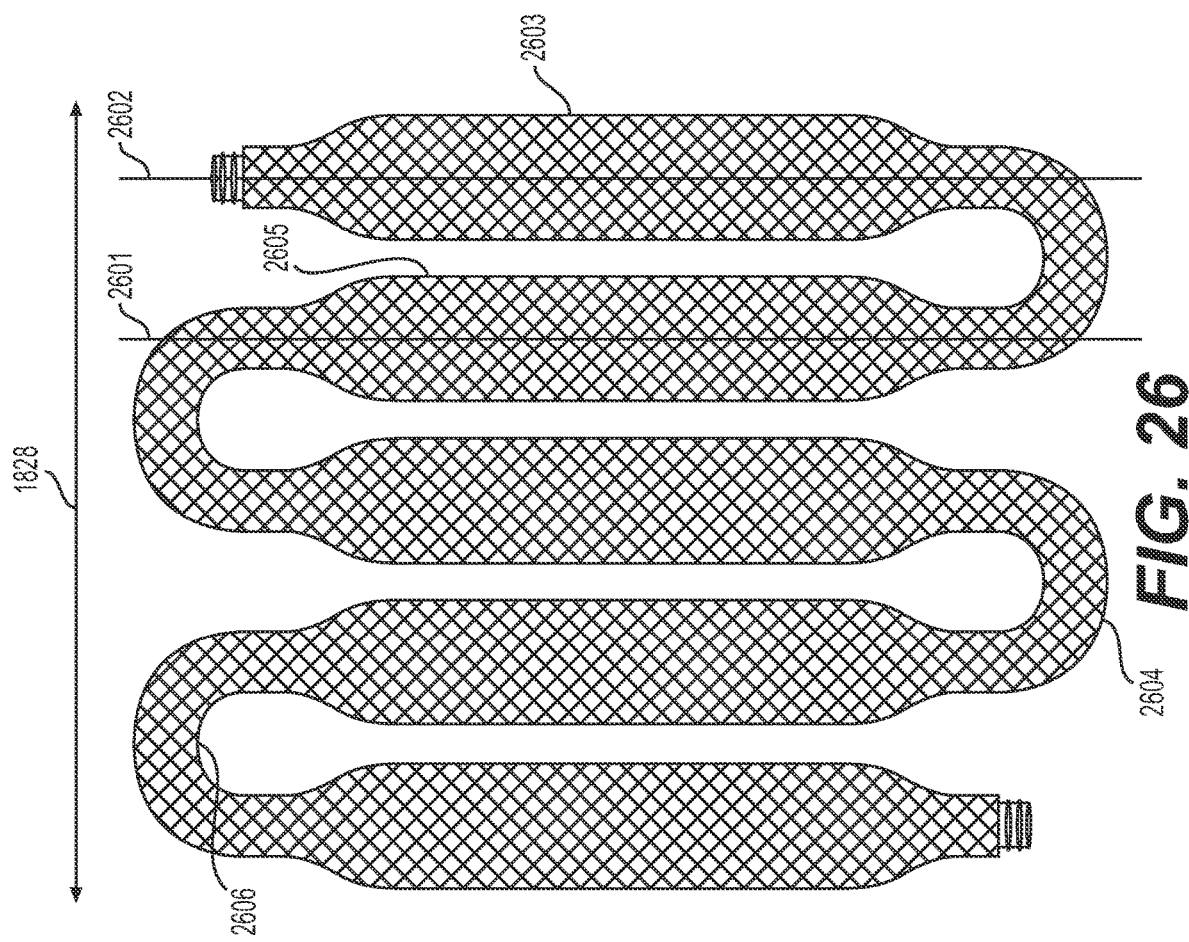

BRAIDED STRUCTURES OF COMPLEX GEOMETRY

CROSS-REFERENCE TO RELATED APPLICATIONS

This patent application is a continuation-in-part of U.S. patent application Ser. No. 15/929,761, filed on May 20, 2020, which is a continuation of U.S. patent application Ser. No. 16/259,236, filed on Jan. 28, 2019, which is a continuation of U.S. patent application Ser. No. 15/811,435, filed on Nov. 13, 2017, now abandoned, which is a continuation of U.S. patent application Ser. No. 15/089,548, filed on Apr. 2, 2016, now U.S. Pat. No. 9,816,210, which claims priority to and the benefit of U.S.

Provisional Application No. 62/142,603 filed on Apr. 3, 2015, all of which is incorporated by reference herein in their entirety.

TECHNICAL FIELD

The present subject matter relates to allantoidal braided structures as well as braided structures with complex geometry and a method for the formation of the braided structures.

BACKGROUND

Conventional braiding machines may be comprised of a plurality of tow carrier devices dispersed around a braiding machine track. Braided products formed by conventional braiding machines may be comprised of a two over, two under (2×2) braid architecture in which two clockwise traveling tow carrier devices may pass over two counterclockwise traveling tow carrier devices and under two counterclockwise traveling tow carrier devices in a repeating pattern. Tow carrier devices may travel circumferentially as well as radially inwards and outwards around the braiding machine track to promote the intertwining of tows to form the braided structure.

Braided products comprised of 2×2 braid architectures may be overbraided onto preforms of complex geometry in which the largest cross-sectional portion of the preform may be larger than that of the smallest cross-sectional portion of the preform. One example of a preform of complex geometry may be a classic Coca-Cola® bottle; wherein a straw is symmetrically affixed in the center of the opening. The straw may be analogized to the center of a braiding machine and the exterior surface of the bottle may be analogized to a preform having a complex geometry onto which braid may be formed. The formation of the braided structure may be initiated at the top of the coke bottle. The braiding machine track may be located near the base of the bottle, or the largest cross-sectional portion of the coke bottle. Tows affixed to tow carrier devices traveling around the braiding machine track intertwine to form a braided structure around the outer surface of the coke bottle which may be analogous to a sleeve covering the surface of the coke bottle. The coke bottle may be vertically advanced as the braiding structure forms on the outer surface of the coke bottle. The cross section of the coke bottle transverse to the longitudinal axis represented by the straw may be transitory and represented as a series of circular shapes having a series of varying diameters. The diameter of the opening of the coke bottle may comprise the smallest cross-sectional diameter, while the base may comprise the largest cross-sectional diameter. In one example, the ratio of cross-sectional diameter of the largest portion of a preform of complex geometry to the smallest portion of the preform of complex geometry may be 5 to 1, 3 to 1, 10 to 1 and other variations, such as 5 to 2 and 3 to 2 etc. In additional examples, if the largest cross-sectional portion of the preform were to exceed three times that of the smallest cross-sectional portion of the preform, bunching or wrinkling of the braided product may occur. A higher ratio of the largest to the smallest cross-sectional diameter of the preform may exacerbate these structural imperfections.

Conventional 2×2 braided products may experience low compaction of tows within the braided structure as well as high compaction of tows within the braided structure as a result of the complex geometry of the preform on which the braided product may be overbraided. A low compaction area may be described as an area in which the tows within the braided structure may be spaced apart while a high compaction area may be described as an area in which tows may be touching, overlapping or stacked on top of another. In a case in which the largest portion of the preform may exceed three times that of the smallest portion of the preform, bunching or wrinkling of the braided product may occur. Bunching or wrinkling may occur when tows within the braided structure may not be compacted, in a high compaction situation, any closer together. This may place stress on the braided structure and may cause the braided structure to bunch or wrinkle to allow further compaction of the braided structure to take place. This distortion of the braided structure is undesirable.

The creation of braided structures with reduced distortion when overbraided onto preforms of complex geometry, in which the ratio of the largest cross-sectional diameter of the braided product to the smallest cross-sectional diameter of the braided product may exceed a generally three to one ratio, is desired.

Braided structures created using traditional maypole style braiding machines may conventionally be produced in a tubular form. Braided tubular sleeves may be overbraided onto preforms with complex cross-sectional geometries, and may conform to the shape of these preforms. However, this may lead to disruption in the braided structure; inducing areas of high and low tension and resulting in variation of bias angle across the preform. This may be especially evident when preforms of varying large and small cross-sectional geometries along the longitudinal axis may be overbraided with braided sleeve products. In these products, areas of large cross-sectional geometries may experience high tension and distorted braid geometry, or high bias angles, while small cross-sectional geometries may experience very low tension, low bias angles and may not conform well to smaller cross-sectional geometries especially in cases in which the difference between the large and small cross-sectional geometries may be significant, including 5:1, 8:1 or 10:1 ratios.

A method for the creation of a braided product which may maintain the same tension over all sections of a preform with varying cross-sectional geometry is desired.

Further, tubular braided products overbraided onto preforms such as flexible tubing may tend to bunch or kink at bending locations. In a continuing discussion of a Coca-Cola® bottle as a preform of complex geometry, two coke bottles may be affixed such that each top of each coke bottle is coincident and concentric. The location at which the two coke bottles are affixed to one another may be defined as the bending location. At this location, the smallest diameter cross-sectional portions of the coke bottles are in contact and when affixed may comprise a continuous section of small cross-sectional diameter. Within commercial braided products, it is desired to orient the two affixed coke bottles parallel to one another. To achieve this, the two affixed coke bottle tops must be curved in relation to the axis of each bottle defined by the straw. As a result, it may be envisioned that as the affixed coke bottle tops are curved, one portion of each top must become stretched, while another portion must compress to form a "U" shape such that the two coke bottles may become parallel to one another. The distortions resulting from such an arrangement is undesirable in commercial braided as an area of high material density, wrinkling and distortion in the braided product may be created below the bending point, or the smallest portion of the "U" shape or bending radius while an area of high tension and high bias angle may be created within the braided product over the bending point, or the largest portion of the "U" shape or bend radius. It is desired to eliminate these distortions at bending locations in braided products.

In addition, the braid architecture as well as the number of tow carrier devices present in conventional braiding machines may not be easily or efficiently altered during the braiding process. Additional flexibility in the number of tow carrier devices a braiding machine may comprise at a single point in time is desirable to maximize the diversity of products which may be produced on a single braiding machine.

SUMMARY

The present subject matter relates to allantoidal braided structures as well as braided structures with complex geometry and a method for the formation of the braided structures.

The present subject matter relates in particular to embodiments of a braiding machine which may be comprised of a plurality of tow carrier devices dispersed across a braiding machine surface comprising a track, or guide, on which tow carrier devices may travel circumferentially around the braiding machine as well as radially inwards and outwards from the braiding machine center to allow for the intertwining of tow materials. In addition, the present subject matter relates to the formation of a high compaction braided structures which, in one embodiment, may be comprised of an N×N braid architecture, where N may be any number greater than two.

The present subject matter relates to a braiding machine comprised of tow carrier transfer devices which, in an embodiment, may be horn disks comprised of a number of radial slots, 2N to allow for the acceptance of N, S traveling tow carrier devices and N, Z traveling tow carrier devices in each horn disk or tow carrier transfer device.

Additionally, the present subject matter relates to a braided structure with longitudinally varying architecture. The braiding machine of the present subject matter may generally be comprised of a plurality of tow carrier devices dispersed around a braiding machine track. Further, the braiding machine may comprise an outer braiding machine track on which braiding occurs and an inner ring, or a sequester ring, comprised of sequester disks which may allow for the addition and removal of tow carrier devices from the outer braiding machine track.

The braided structure of embodiments of the present subject matter may be comprised of a pattern of varying braid architecture in which braid architectures comprised of high numbers of tows crossing over and under each other, for example 5×5 braid architecture, may correspond with larger cross-sectional dimensions of the braided product. Conversely, braid architectures comprised of low numbers of tows crossing over and under each other, for example 1×1 braid architectures, may correspond with small cross-sectional dimensions of the braided product.

In addition, the braided product may be comprised of sections in which the braid architecture may transition from a higher number of tows crossing over and under each other, for example a 5×5 braid architecture, to a lower number of tows crossing over and under each other, for example 1×1 braid architecture.

BRIEF DESCRIPTION OF DRAWINGS

FIG. 10 illustrates a high compaction braided product overbraided onto a generally bellows shaped preform;

FIG. 23A illustrates a cross-sectional view of a braided structure with longitudinally varying architecture while

FIG. 26 illustrates a plurality of allantoidal preforms overbraided with the braided structure with longitudinally varying architecture in a non-collinear arrangement.

DETAILED DESCRIPTION

Figure 1:
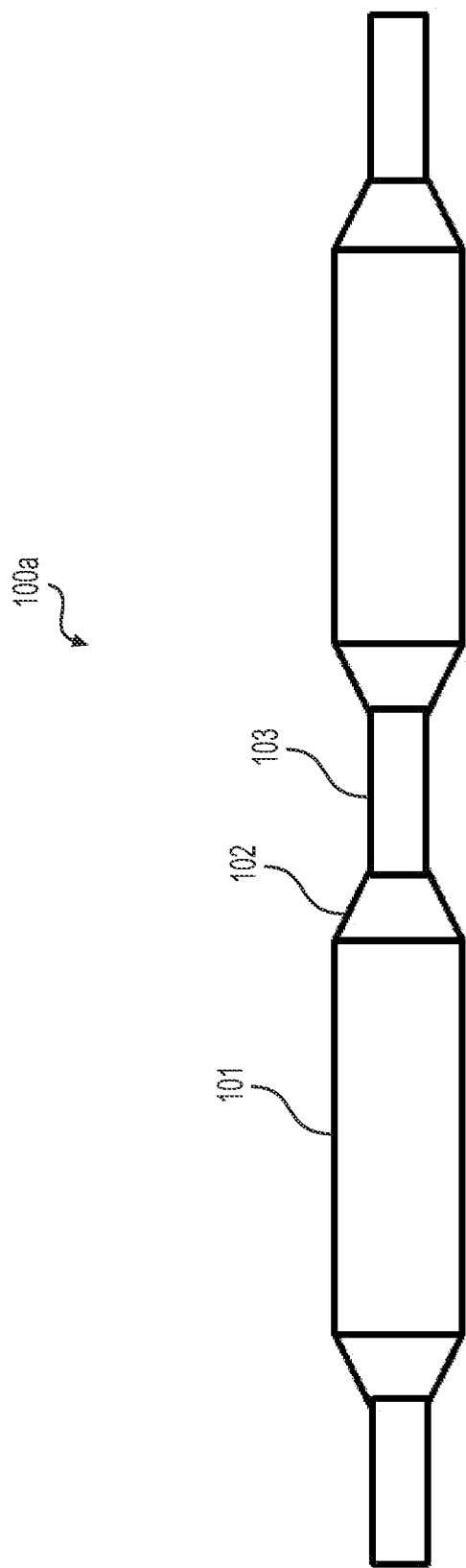
FIG. 1 illustrates a generally allantoidal preform.

The present subject matter relates to allantoidal braided structures as well as braided structures with complex geometry and a method for the formation of the braided structures described herein.

Braided structures are used extensively in the manufacture of composite parts as reinforcements materials embedded in a resin matrix. It is also known to use braided structures as distinct components within an assembly of parts, for instance, as a blade-out containment component in a jet engine component. Braided structures are often preferred over other types of structures, such as woven structures, because tows of material within the structure can be oriented along non-perpendicular directions and the structures can either conform to a surface upon application or be manufactured in to conform to a specific surface.

As used herein, a "braided structure" is a product comprised of three or more strands of material (tows) such that each tow is joined with other tows in a repeating intertwined pattern. Two-dimensional braided materials are those wherein the repeating pattern is largely characterized by two or more principal directions in a plane, typically the longitudinal direction of the braided structure, commonly called the longitudinal axis or the, axial direction and one or more oblique directions, commonly called bias directions, each at a predetermined angle to the longitudinal axis or direction.

The term longitudinal axis as used in the specification herein refers to an axis generally perpendicular to the braiding machine track along which a braided structure is formed. This longitudinal axis is additionally described in reference to braided structures in which bias tow materials are oriented in angular positions in reference to the longitudinal axis of the braided structure, or along the axis in which the braided structure was formed. Examples of bias directions for various braiding architectures with respect to the longitudinal axis include 450 and 600 angular positions. Three-dimensional braided structures are those wherein additional principal directions, generally mutually perpendicular to the longitudinal and oblique directions, are required to completely define the structure and the patterns thereof. For simplicity of description, these additional directions are generically referred to as radial directions, whether the structure is generally tubular in form, laid out as a flattened tubular form or in a fabric, or generally planar form.

Two-dimensional braided structures may be manufactured as generally cylindrical materials, commonly called sleeves, with the axial direction corresponding to the longitudinal axis of the cylinder and the bias directions oblique to the longitudinal axis. Braided structures manufactured in cylindrical form may then be laid-flat to form a two-dimensional fabric comprised of two layers joined along the longitudinal edges. The edges may be removed to form two separate and distinct layers. One edge may be removed and the cylindrical structure laid-flat to form a singly-slit single layer structure. Two edges may be removed to form a double-slit two layer structure. Two-dimensional braided structures may further be manufactured in a single layer flat form, commonly called a tape.

In this disclosure reference to braided structure generally implies two-dimensional forms but does not exclude three-dimensional forms.

In this disclosure reference to braided fabric is generally directed to two-dimensional fabric forms but one skilled in the art recognizes that three-dimensional braided materials may be used in particular embodiments of the present invention as desired to satisfy requirements of particular applications.

Common terms used to describe braided structures are based on a Cartesian system of directions and rotations as applied to a plane surface considered to be formed from cylindrical surface after it is slit in the direction of the longitudinal axis and the cylindrical surface rolled out into a plane.

The longitudinal axis of braided structures is often used as a reference direction when describing the orientations of sets of tows in the braided structure. Directions oblique to the longitudinal axis are often referred to as bias directions. Oblique directions oriented at angles clockwise to the longitudinal axis are generally referred to as positive bias directions and those oriented at angles counterclockwise to the longitudinal axis are generally referred to as negative bias directions.

Biaxial braided structures have two sets of tows, one oriented along a positive bias direction and the other along a negative bias direction. A typical shorthand description of the orientations of the two sets within a biaxial braided structure is comprised of a positive and a negative number each numerating the bias angle for a set of tows. For example, a biaxial braided structure called Bimax, manufactured by A&P Technology, Inc., is designated as a +45°/−45° braid.

An inherent feature of biaxial braided structures is that the tows comprising the braided structure can move relative to one another and allow the braided structure to conform to a range of surfaces without compromising the braided structure or the tows. After conformation to a specific surface the general relative orientation of tows within sets and set to set is maintained and may be best understood by considering the Cartesian system to have been mapped onto the surface.

Triaxial braided structures may be manufactured to conform to a specific surface at the time of manufacture by overbraiding onto a specific surface so that the locking action of the axial tows occurs as the braided structure is laid on the surface and the geometry of the braided structure assumes and retains its as-manufactured configuration.

The addition of axial tows restricts relative motion of tows thereby generally locking the structure in the as-manufactured geometry. Triaxial braided structures are generally used in sheet or tubular form or are manufactured to conform to a specific surface at the time of manufacture.

Triaxial braided structures have three sets of tows. Two sets are oriented as described for biaxial structures. The third set of tows is oriented along the longitudinal axis and intertwined with the first and second set of tows. A typical shorthand description for a triaxial braid structure includes the angular orientation of each tow set relative to the longitudinal axis and the longitudinal axis itself to better convey that the braided structure is triaxial. For example, a triaxial braided structure marketed as Qiso, manufactured by A&P Technology, is designated as a +60°/0°/−60° braid structure.

The terms "strand", "tow", "yarn", "yarn bundle", "fiber" and "fiber bundle" are generally meant to describe a primary intertwined component of the braided structure, laid in each of the principal directions. The tow itself may be comprised of multiple components (e.g., individual filaments) that run together in a principal direction. A tow can comprise monofilament arrangements, multiple filament arrangements or be comprised of staple or spun material. Tow material can have a variety of cross-sectional shapes, including but not limited to, circular, ellipsoidal, triangular and flat tape shapes, as well as other variants thereof. Tow material may be subject to intermediate or pre-processing prior to braiding operations. Examples of intermediate or pre-processing may include, but are not limited to, twisting, braiding small numbers of filaments into braided tow materials, pre-impregnation with resins and specialty coating to facilitate braiding and/or subsequent processing. A tow can comprise any combination of these materials and material forms. Any one tow may comprise one or more filament or staple materials. As non-limiting examples, a tow may be comprised of carbon materials, basalt, glass materials, thermoplastic polymeric materials, thermoset polymeric materials, a combination of carbon and polymeric materials or a combination of polymeric and glass materials, or some combination thereof. Tows that lay in one of the bias directions of the fabric are commonly called bias tows. Tows that lay along the longitudinal axis of the fabric are commonly called axial tows.

As used herein, the term braid architecture may be defined as the pattern in which tow materials oriented in bias directions may be intertwined to form a braided structure in which an integer, N, of clockwise oriented tows may pass over and under N counterclockwise oriented tows and in which an integer, N, of counterclockwise oriented tows may pass under and over N clockwise traveling tows. The term braid architecture may also describe, in additional manners, the types of tow materials which comprise a braided structure including in non-limiting example braided structures comprised of axial and bias tows for the formation of a triaxial braided structure, or braided products comprised only of bias tows for the formation of a biaxial braided structure, or braided structures comprised of sections of biaxial and triaxial sections, or hybrid braided structures. As used herein, biaxial braid describes braided structures comprised of bias tows. Triaxial braid is comprised of bias and axial tows. Hybrid braided structure are comprised of contiguous tow materials comprising adjacent regions of biaxial and triaxial braided structures.

The term contiguous as described herein refers to undisrupted lengths of a tow material within a braided structure. Disruption in the length of a tow may be described as the presence of splices, stitching, tying or other methods of cutting and reaffixing portions of tow material to one another.

In the art several terms in common use describe the most common braid architectures. For example, in regular or plain braid architecture each bias tow is intertwined into the structure such that it passes over two bias tows in the opposing bias direction and under two bias tows in the opposing bias direction in a repeated pattern. The numerical designation 2×2, typically read as "two-over, two-under", may be used to define this pattern. Similarly, Hercules braid architecture is a 3×3 architecture wherein each bias tow passes over three bias tows in the opposing bias direction then under three bias tows in the opposing bias direction in a repeated pattern. Further, diamond braid architecture is 1×1 architecture.

As used herein, a braiding machine is an apparatus for manufacture of braided structures. Said machine may be specific to a particular braid architecture or family of related braid architectures or general in that it can produce multiple braid architectures. Examples of braiding machines include maypole braiding machines or 3D braiding machines.

Biaxial and triaxial two-dimensional braids are commonly made on maypole braiding machines. A maypole braiding machine is generally comprised of a flat ring assembly on which tow carrier devices are deployed. The tow carrier devices are transported along the circumferential direction of the flat ring and caused to move in and out along the radial direction. One group of tow carrier devices, generally half the number of total tow carriers deployed in the machine, moves in the counterclockwise, or S, circumferential direction and another group of tow carrier devices moves in the clockwise, or Z, circumferential direction. For description purposes, the tow carrier devices moving in the S circumferential direction are called the S carriers and those moving in the Z circumferential direction are called the Z carriers. The combination of circumferential and inner and outer radial motion affects intertwining of the S and Z carriers. For a regular or plain 2×2 braid, the S and Z carriers move in the circumferential and radial directions so that the tow paid out by each S carrier passes over two Z carrier tows and under two Z carrier tows in a repeated pattern and vice versa for Z and S carriers.

The present subject matter relates in particular to embodiments of a braiding machine which may be comprised of a plurality of tow carrier devices dispersed across a braiding machine surface comprising a track, or guide, on which tow carrier devices may travel circumferentially around the braiding machine as well as radially inwards and outwards from the braiding machine center to allow for intertwining of tow materials. In addition, the present subject matter relates to allantoidal braided structures as well as braided structures with complex geometry and a method for the formation of the braided structures.

An embodiment of the braided structure of the present subject matter relates to the formation of a high compaction braided structure which, in embodiments herein, may be comprised of a ten over and ten under (10×10) braid architecture in which ten S traveling tow carrier devices pass under ten Z traveling tow carrier devices and over ten Z tow carrier devices in a repeating pattern, and ten Z traveling tow carrier devices pass over ten S traveling tow carrier devices and under ten S traveling tow carrier devices in a repeating pattern.

The high compaction braided structure of the present subject matter may have particular utility for the formation of braided products comprising complex geometry including, but not limited to allantoidal 100a braided products and braided products which must undergo physical shape changes as a function of application. One example of an allantoidal braided product is shown in FIG. 1 as structure 100a.

Allantoidal shaped braided products 100a may be described as braided products which may be comprised of several sections of invariable cross-sectional diameters, 101 and 103, and several sections of transitory cross-sectional diameters, 102, between sections of invariable cross-sectional diameters, 101 and 103. In embodiments of the present subject matter, an allantoidal shaped braided product 100a may be comprised of a section of invariable diameter 101, and a second section of invariable diameter 103, in addition to a section of transitioning diameter 102, in combinations repetitive along the longitudinal length of the braided product. In embodiments of the present subject matter, a plurality of invariable diameter sections may comprise the allantoidal shaped braided product as well as a plurality of variable diameter sections, which may or may not be repetitive along the longitudinal length of the braided product. In addition, the cross-sectional shape of the allantoidal shaped braided product may be comprised of generally annular shapes including, but not limited to circular, oval, triangular, square and certain other shapes.

Conventional braided products may be comprised of a two over and two under (2×2) braid architecture in which two S traveling tow carrier devices pass under two Z traveling tow carrier devices and then over two Z traveling tow carrier devices in a repeating pattern. When conventional 2×2 braid architectures may be overbraided onto preforms with complex cross-sectional geometry, braided products may stretch in some areas in which the preform may be comprised of large cross-sectional geometry and become compact in areas in which the preform may be comprised of small cross-sectional geometry. Overbraiding may be defined as the process in which a braided sleeve structure may be formed over the surface of a preform, generally aligned perpendicularly to the braiding machine track along the longitudinal axis of the braiding machine, such that all features comprising the surface of the preform are covered by the braided sleeve structure and such that the braided product generally conforms to all features comprising the surface of the preform. In a non-limiting example of FIG. 1, a 2×2 braided product 100a may stretch across section 101 and become compact across section 103.

Allantoidal preforms of complex geometry as described herein may be comprised of a liner affixed to a removable core such that the removable core may provide rigidity to the preform as the braided structure may be overbraided over the preform of complex geometry, and may be removed to form a commercial braided product comprised of an overbraided liner and braided structure as described herein.

Areas of large cross-sectional geometry, in which the braided product may become stretched over the preform, may result in areas of low compaction of a braided product while, areas of small cross-sectional geometry of a preform, in which a braided structure may become compact, may lead to areas of high compaction of a braided product. Low compaction of a braided product may be described as low fiber density in which there may be space between tows within the braided structure while high compaction of a braided product may be described as high fiber density in which there may be little to no space between tows. Further, in areas of high compaction, tows may overlap with one another or lie atop one another, based on the degree of compaction in high compaction areas of a braided product.

In the case of a 2×2 braided product, compaction may be limited by the maximum distance tow fibers may be stretched apart and limited by how tightly tows may be arranged within the braided structure. Generally, for traditional 2×2 braided products, areas of high and low compaction, or sections of small and large cross-sectional geometry of the preform, may be restricted to a three to one ratio in which the largest section of the preform may only be three times larger than that of the smallest section of the preform. In a continuing example of FIG. 1, the diameter of section 101 may only be three times larger than the diameter of section 103. This three to one ratio may limit the variety of products which may be created using a 2×2 braided structure.

In addition, bunching or wrinkling may occur when a preform with complex cross-sectional geometry may be overbraided with a 2×2 braided structure. This bunching, or wrinkling of the braided structure may occur when, in areas of high compaction, tows may become so tightly compacted that tows may no longer be forced together any further. Stress within the braided product may result in the buckling of the braided structure to allow for additional compaction in this area to take place.

The high compaction braided product of the present subject matter may allow for greater variation in the cross-sectional geometry of braided preforms as well as the elimination of bunching or wrinkling of a braided structure in areas of complex geometry of the preform.

As described in embodiments herein, the high compaction braided product of the present subject matter may be comprised of 10×10 braid architecture. The 10×10 braid architecture of an embodiment may significantly increase the difference between the distance tows may be stretched apart and compacted when compared to 2×2 braid architectures. A comparison of the compaction of tows in 10×10 braid architectures and 2×2 braid architectures may be illustrated in FIGS. 2, 3 and 4.

Figure 2:
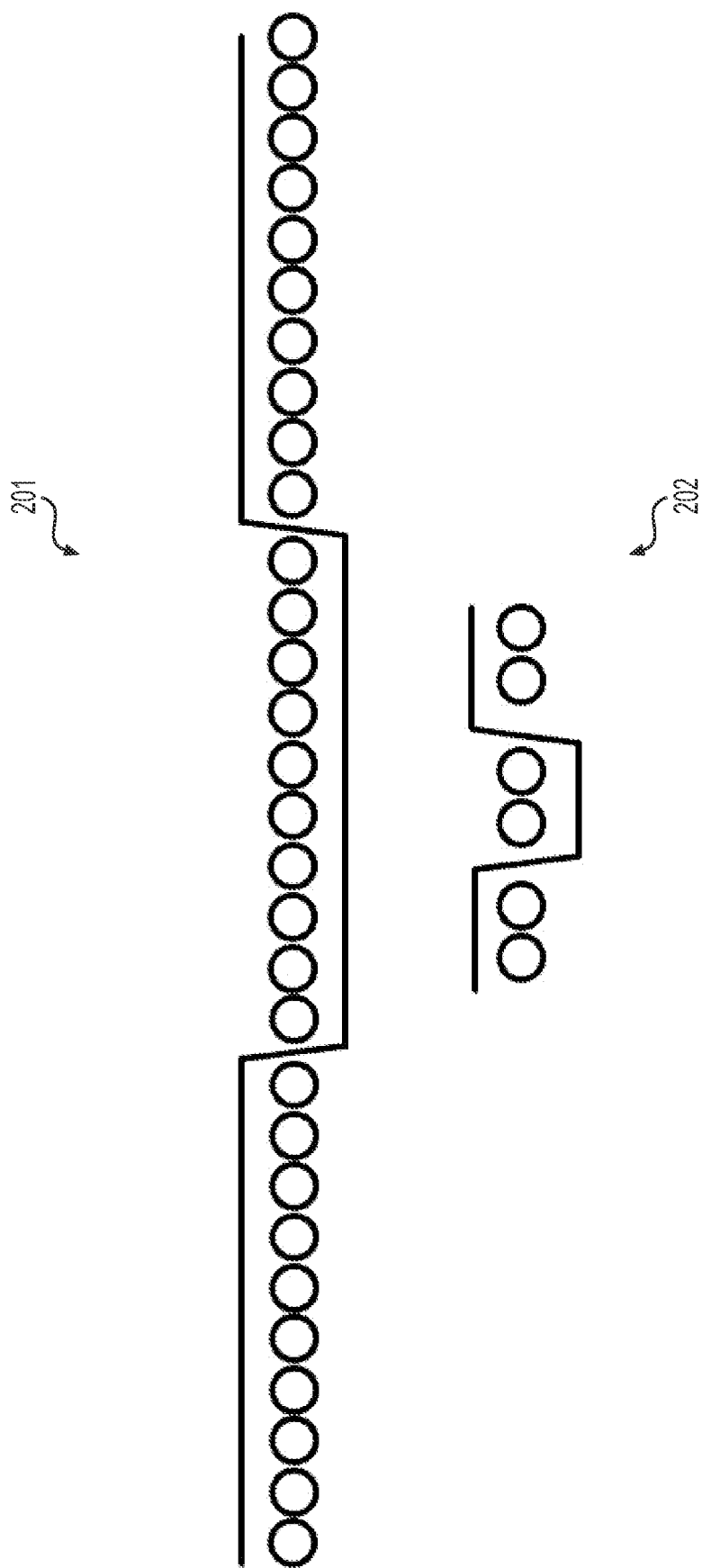
FIG. 2 illustrates the compaction of tows in a low compaction situation.
Figure 3:
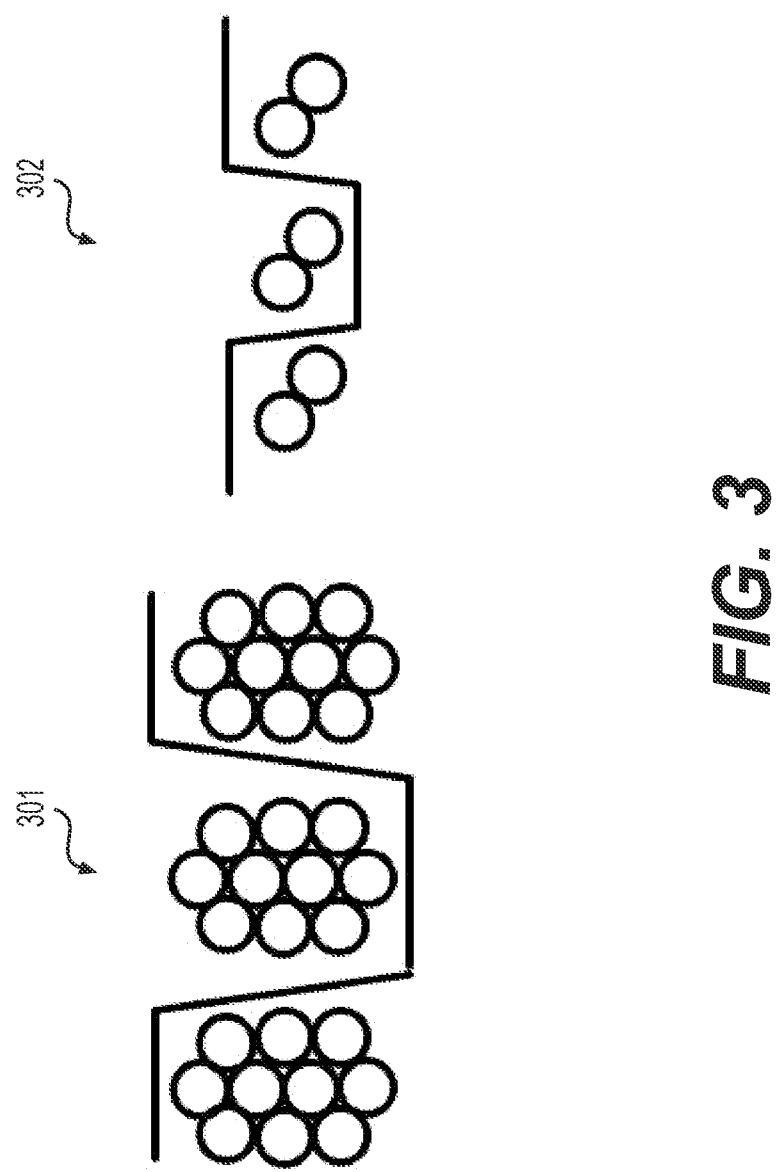
FIG. 3 illustrates the compaction of tows in a moderate high compaction situation.
Figure 4:
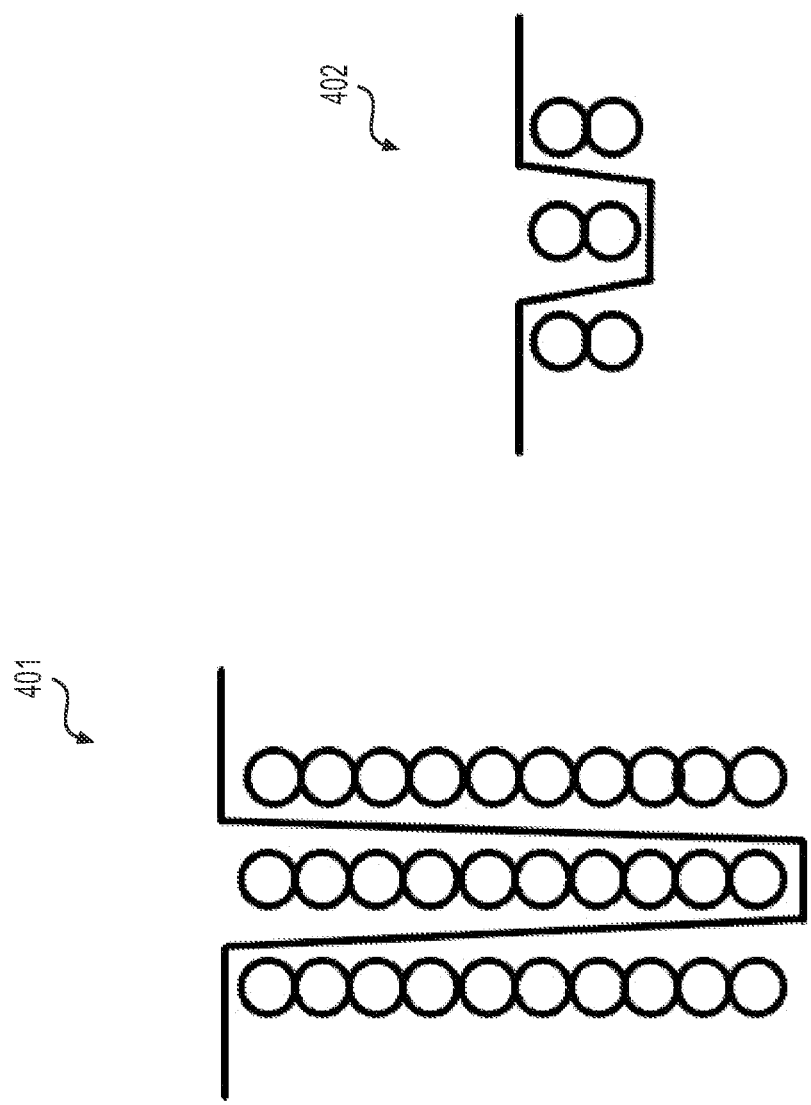
FIG. 4 illustrates the compaction of tows in a high compaction situation.

FIGS. 2, 3 and 4 are illustrative of varying compaction levels of a braid shown along a cross section, including low compaction 201, intermediate compaction 301 and high compaction 401 of 10×10 braid architecture as well as low compaction 202, intermediate compaction 302 and high compaction 402 of 2×2 braid architecture. Subsequently, there is significant difference in compaction between the lowest and highest degrees of compaction of a 10×10 braid architecture may be achieved when compared to a standard 2×2 braid architecture. This may allow for the 10×10 braid architecture of an embodiment herein to conform to preforms of more complex and variable geometry than may be achieved with 2×2 braid architectures.

The 10×10 braid architecture of an embodiment of the present subject matter may have particular utility for the creation of high compaction braided structures with complex and widely variable geometries. The braiding machine to produce the 10×10 braid architecture is comprised of a plurality of tow carrier devices and is significantly larger than that of a braiding machine of a 2×2 braid architecture comprised of the same number of tow carrier devices.

Traditional tow carrier components which support the transfer of tow carriers, also called horn disks, in standard 2×2 braiding machines may be comprised of four radial slots to accept an average of two total S traveling tow carrier devices as well as an average of two total Z traveling tow carrier devices to form a 2×2 braid architecture. However, for the creation of a 10×10 braid architecture of an embodiment herein, the horn disks may be comprised of 20 radial slots to accept ten S traveling tow carrier devices as well as ten Z traveling tow carrier devices. Subsequently, in another embodiment of the present subject matter comprising a 5×5 braid architecture, a horn disk may be comprised of 10 radial slots to accept an average of 5 total S traveling tow carrier devices and an average of 5 total Z traveling tow carrier devices. Consequently, a horn disk comprised of 20 radial slots for the formation of a 10×10 braid architecture may be 5 times larger than that of a standard horn disk to accept 20 tow carrier devices in total, significantly increasing the diameter of the braiding machine of the present subject matter.

In addition to the increased size of horn disks for 10×10 braid architectures in embodiments herein, specialized tow carrier devices may be created to reduce the effect of "sawing" as tow carrier devices travel around the braiding machine track of an embodiment of the present subject matter. Sawing may be described as an event in which tow length and tension change as a result of radial movement of tow carrier devices away from and closer to the center of a braiding machine as a result of the intertwining of tow carrier devices. In addition, sawing may result in material being paid off, or pulled off, the tow carrier device as a result of the varying position of the tow carrier device. Ideally, material may only pay off a tow carrier device as the longitudinal length of the finished braided product increases and as the braided product is pulled from the center of the braiding machine and onto a take-up device.

Sawing may result in an increase in length and tension in a tow as a tow carrier device moves to the outermost radial point from the center of the braiding machine on the braiding machine track and may result in the decrease in tow length and tension as a tow carrier device may move to the innermost radial point of the braiding machine track to the center of the braiding machine.

This sawing effect may become exacerbated by the increased size of the horn disks required for a 10×10 braid architecture of embodiments herein. To reduce the effects of sawing in a 10×10 braiding machine, specialized tow carrier devices may be created which account for the increased size of the horn disks in embodiments of the present subject matter.

Figure 5:
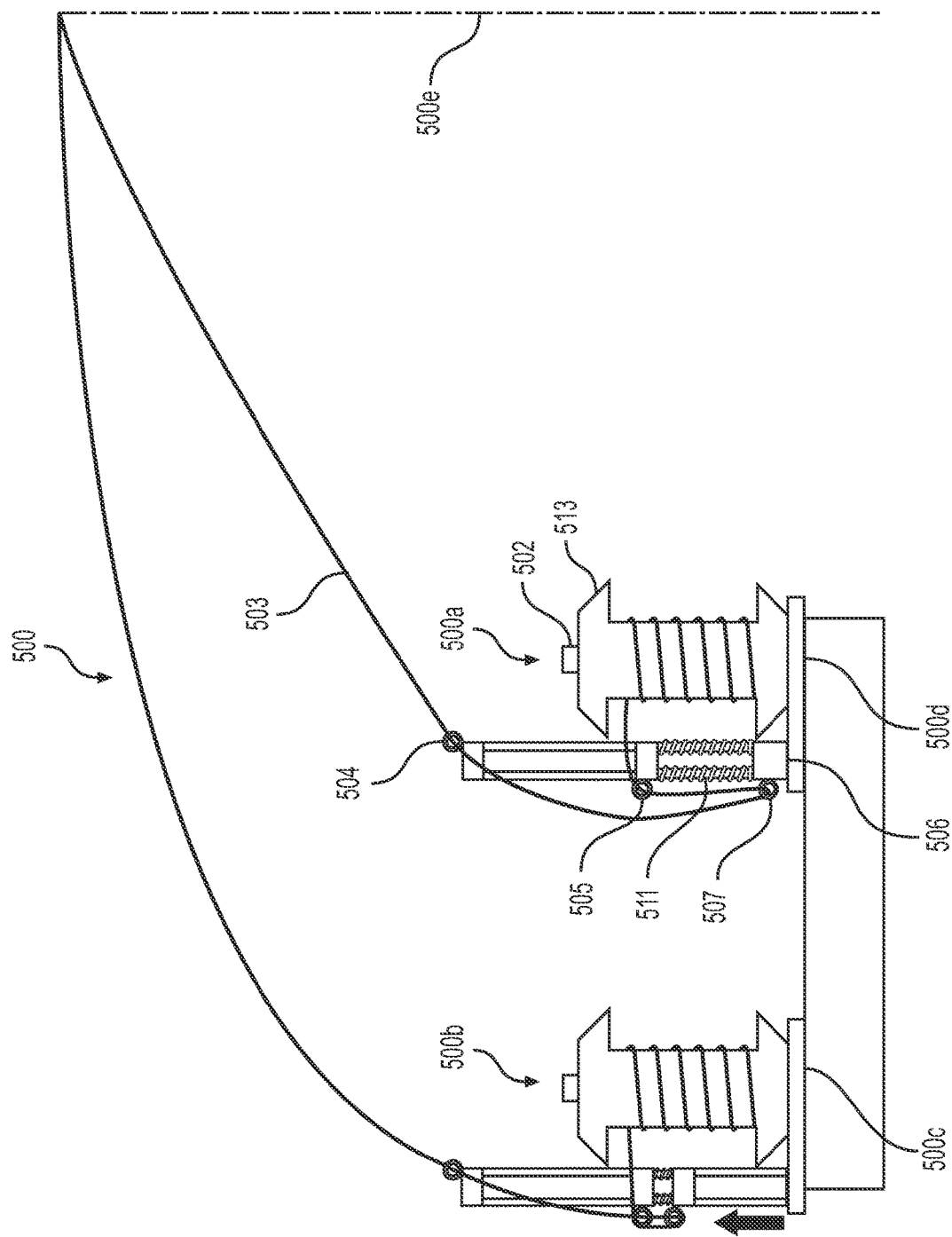
FIG. 5 illustrates the position of tow carrier devices and the components of which they are comprised far from and close to the center of the braiding machine.

Regarding FIG. 5, typical tow carrier devices 500*a* dispersed around a braiding machine 500 may be comprised of a stem 502 on which a spool 513 may be affixed, three eyes (middle 505, top 504 and bottom 507) or other tow guide elements including, but not limited to rollers in embodiments herein, and a method for tensioning the tow 503 as it is paid off the tow carrier device 500*a*.

A tow 503, wound on a spool 513, may be passed through the middle 505, bottom 507 and top 504 eyes of a tow carrier device 500*a*. The bottom eye 507 of a tow carrier device 500*a* may be affixed to a fixture 506 which may be allowed to move freely along the longitudinal axis of the tow carrier device 500*a*. The fixture 506 to which the bottom eye 507 may be affixed in an embodiment, may herein be referred to as the drop weight 506. The longitudinal position of the drop weight 506 and bottom eye 507 assembly may be affected by the position of the tow carrier device 500*a* within the braiding machine track.

In addition, the drop weight 506 and bottom eye 507 assembly may comprise a tensioning method for a tow 503 passing through the middle 505, bottom 507 and top 504 eyes. In an embodiment of the present subject matter, one or a plurality of springs 511 may provide tension to the tow 503 by providing resistance as the drop weight 506 and bottom eye 507 assembly may travel longitudinally upwards and downwards throughout the movement of the tow carrier device 500*a* around the braiding machine track.

Not only may the drop weight 506 and bottom eye 507 assembly comprise a method for tensioning the tow in a tow carrier device 500*a*, the drop weight 506 and bottom eye 507 also may function to control the changing length of the tow 503 as the tow carrier device 500*a* travels around the braiding machine track.

The movement and longitudinal position of the drop weight 506 and bottom eye 507 assembly may be dictated by the position of the tow carrier device 500*a* within the braiding machine track in an embodiment of the present subject matter.

In an event in which a tow carrier device 500*a* may reach the innermost radial point 500*d* from the center of the braiding machine, the drop weight 506 and bottom eye 507 assembly may be in the lowest longitudinal position allowed by the tow carrier device 500*a*. At this location, the length of the tow 503 between the center 500*e* of the braiding machine 500 and the top eye 504 of the tow carrier device 500*a* may be the shortest required during the braiding process. To account for the length of the tow at the innermost radial point 500*d*, the drop weight 506 and bottom eye 507 assembly may be located at the lowest longitudinal position allowed by the tow carrier device 500*a*. This position may increase the length of the tow in the track defined by the middle 505, bottom 507 and top 504 eyes and decrease the length of the tow 503 between the top eye 504 and the center 500*e* of the braiding machine 500.

Subsequently, in an event in which a tow carrier device 500*b* may reach the outermost radial point 500*c* from the center 500*e* of the braiding machine 500, the drop weight 506 and bottom eye 507 assembly may be at the highest longitudinal position allowed by the tow carrier device 500*b*. At this location, the tow length may be required to be the longest between the top eye 504 of the tow carrier device 500*b* and the center 500*e* of the braiding machine 500. To allow the tow 503 to obtain this length, the drop weight 506 and bottom eye 507 assembly may move longitudinally upwards to increase the length of the tow 503 between the top eye 504 and the center 500*e* of the braiding machine 500. This position decreases the length of the tow 503 in the track defined by the middle 505, bottom 507 and top 504 eyes and increases the length of the tow 503 between the top eye 504 and the center 500*e* of the braiding machine 500.

Consequently, the distance of longitudinal travel allowed by a tow carrier device must be equal or greater than half the distance between the innermost and outermost radial points on a braiding machine track to maintain tension on a tow and to avoid tow material being paid off by the movement of the tow carrier device around the braiding machine track.

If the longitudinal travel distance of the drop weight and bottom eye assembly were less than half the distance between the innermost and outermost points on the braiding machine track, when a tow carrier device may reach the innermost point on the braiding machine track, the length of tow between the top eye and the braiding machine center may be too long, and at the outermost point on the braiding machine track, the tow may be too short. This may result in an undesired length and tension differences.

Figure 6:
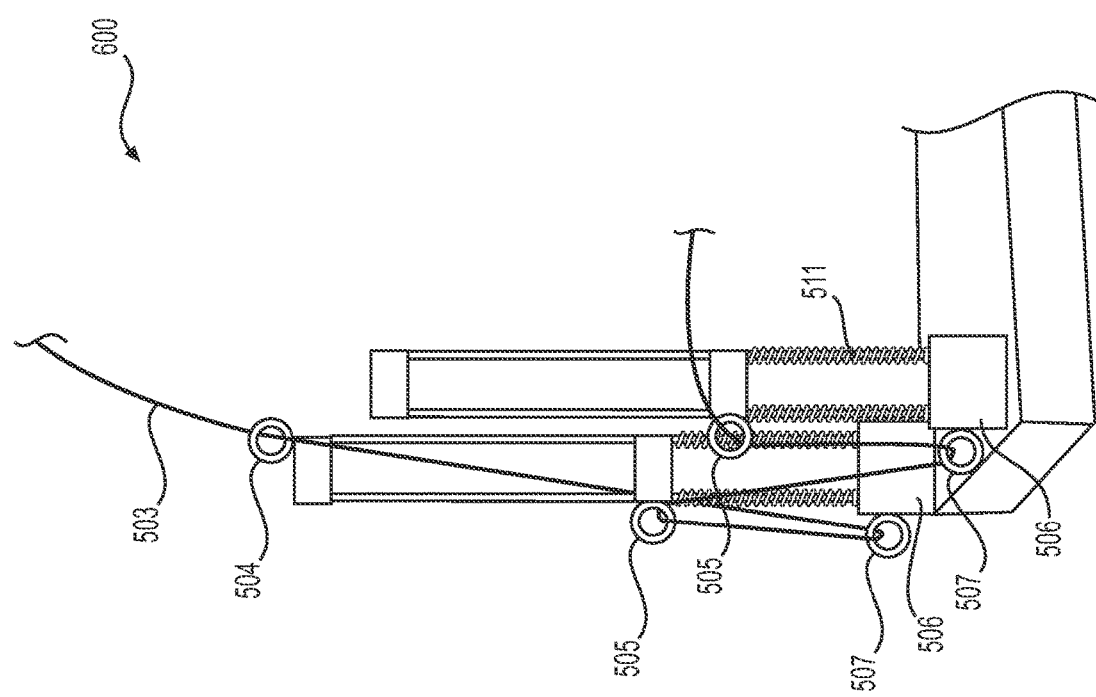
FIG. 6 illustrates a tow carrier device comprised of multiple drop weight and bottom eye assemblies.

Additional embodiments of the specialized tow carrier devices of the present subject matter illustrated in FIG. 6 may comprise a plurality of drop weight 506 and bottom eye 507 assemblies as well as a plurality of middle eyes 505 such that, in a non-limiting example illustrated in FIG. 6 of a tow carrier device 600, a tow 503 may pass through a primary middle eye and into the bottom eye of a primary drop weight and bottom eye assembly, into a secondary middle eye and a secondary bottom eye of a secondary drop weight and bottom eye assembly and finally into a top eye 504 of the tow carrier device 600.

The plurality of drop weight 506 and bottom eye 507 assemblies and plurality of middle eyes 505 of the present subject matter may allow for the same longitudinal travel distance as described in embodiments of the tow carrier devices of the present subject matter, but may allow for a tow carrier device 600 of a reduced height such that the total longitudinal travel distance required in embodiments of the present subject matter may be divided between a plurality of drop weight 506 and bottom eye 507 assemblies such that the summation of the longitudinal travel of each of a plurality of longitudinal travel distances for a plurality of drop weight 506 and bottom eye 507 assemblies may be equal to or greater than half the distance between the inner most and outer most points on a braiding machine track.

Figure 7A:
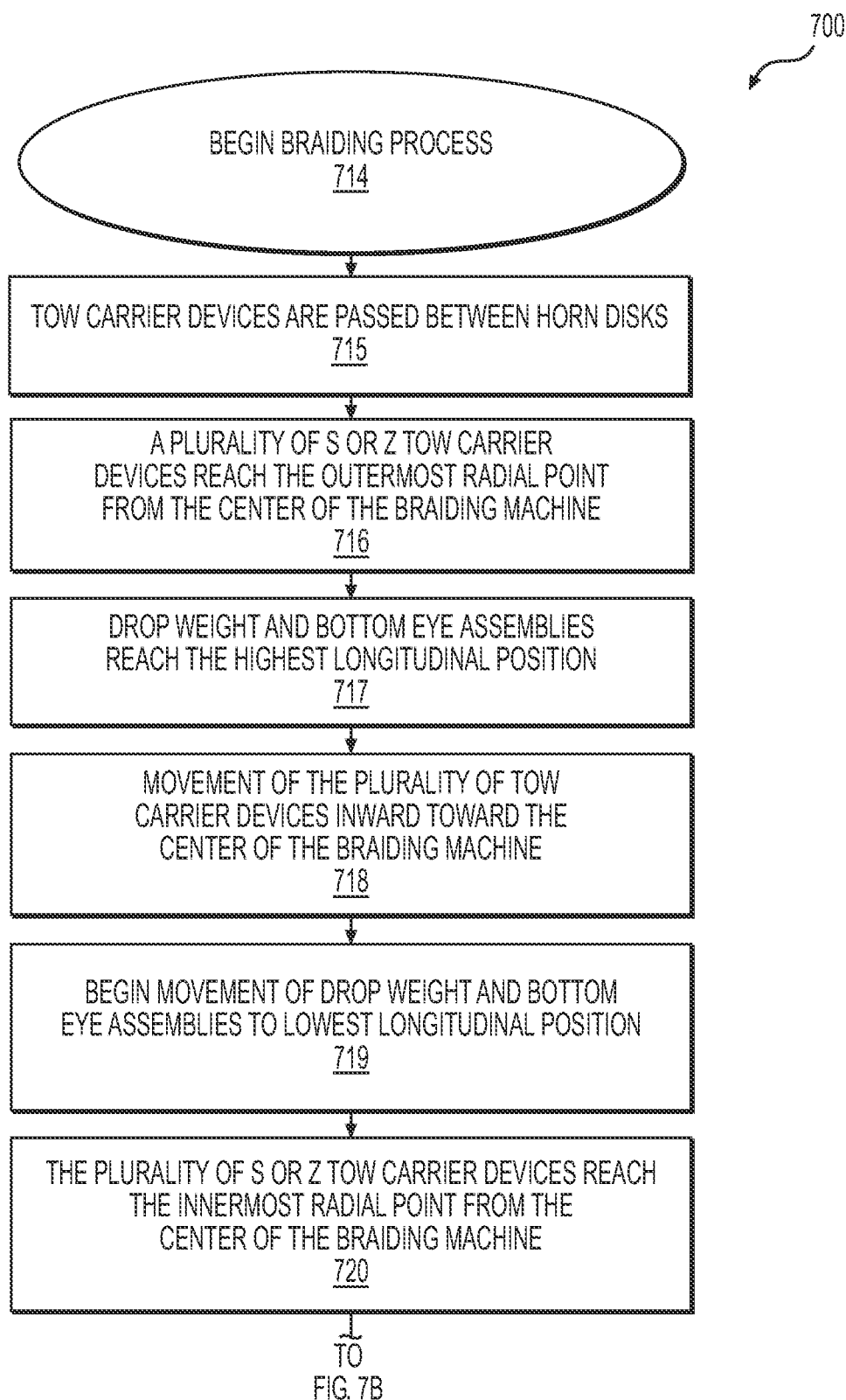
FIGS. 7A and 7B describe the motion of tow carrier devices and the components of which they are comprised during the braiding process.
Figure 7B:
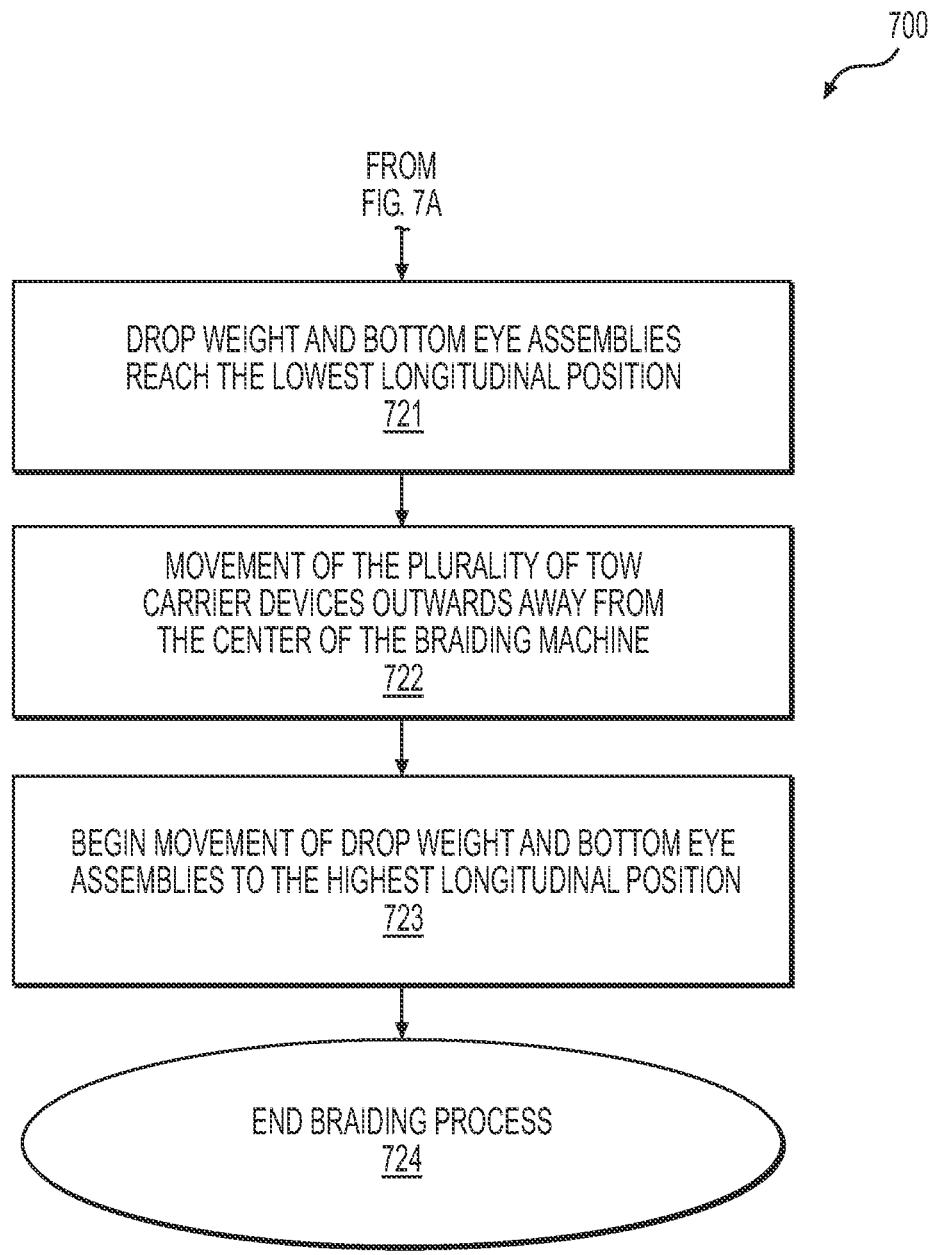

FIGS. 7A and 7B summarize the braiding machine process 700 for the movement of the tow carrier devices and the drop weight and bottom eye assemblies of an embodiment of the present subject matter, including steps 714 through 724 from the beginning to the end of the braiding process 700. The braiding process begins in step 714. The tow carrier transfer devices, or horn disks, may pass tow carrier devices between them in step 715. In steps 716-723 the position of tow carrier devices around the braiding machine track may affect the longitudinal position of the drop weight and bottom eye assemblies. Steps 716-723 may be repeated until the desired longitudinal length of the braided product may be obtained. The braiding process may be terminated in step 724.

The high compaction braided structure described herein, of a 10×10 braid architecture may have particular utility for the creation of braided products with complex geometry including, but not limited to, allantoidal shaped braided products.

Figure 8:
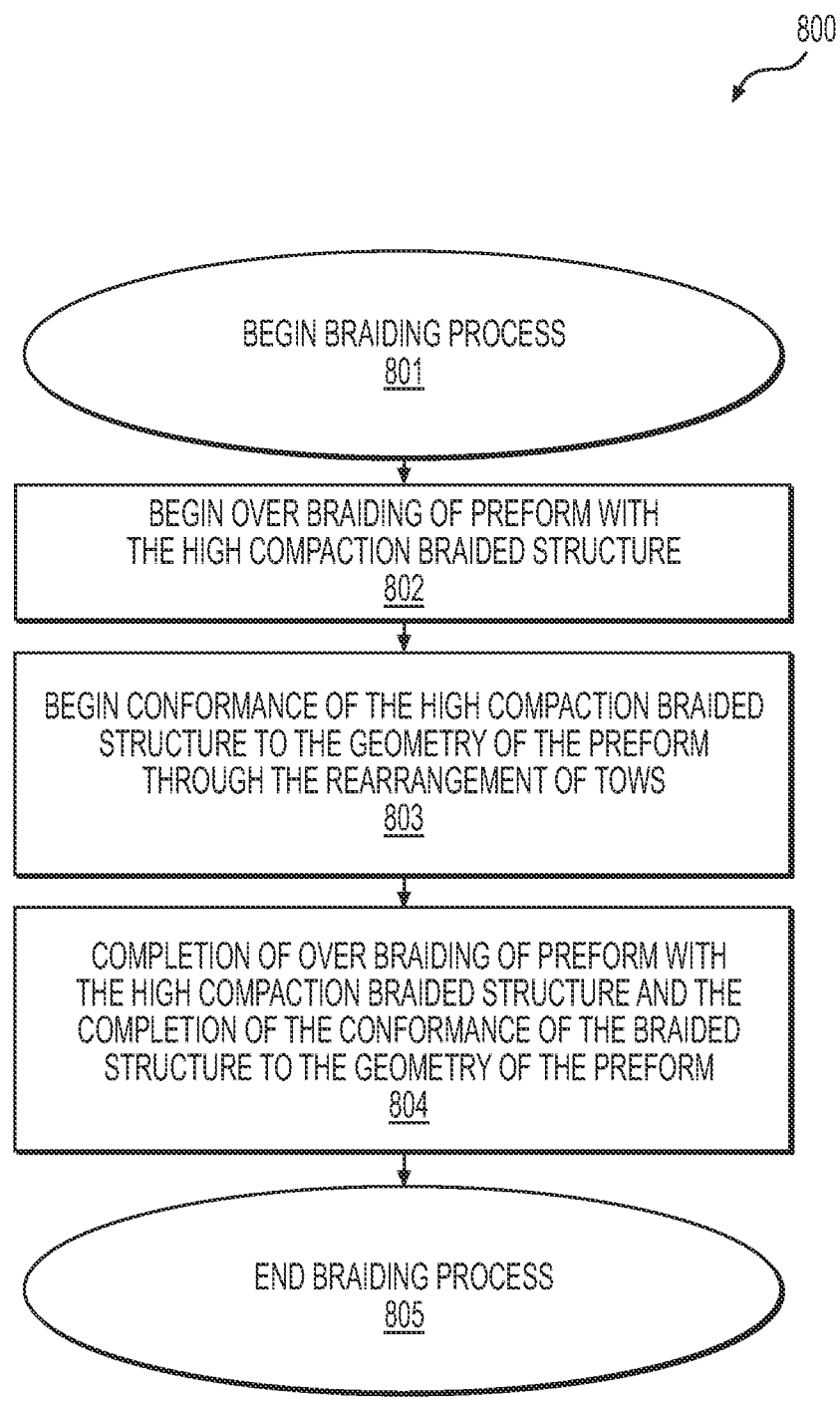
FIG. 8 describes the process by which a high compaction braided structure may be overbraided onto a preform of complex geometry.

The high compaction braided structure of an embodiment herein may be employed in the creation of an allantoidal shaped braided structure overbraided onto a preform. The preform of this embodiment, illustrated in FIG. 9, may be comprised of three distinct sections as defined in FIG. 1, in which there may be two sections of invariable cross-sectional geometry, 101 and 103, and in which one section 101 may have a larger cross-sectional geometry than the other section 103 of invariable cross-sectional geometry. Additionally, embodiments of FIG. 1 and FIG. 9 may also comprise a section 102 of transitional cross-sectional geometry located between the two invariable cross-sectional geometry sections, 101 and 103. FIG. 8 is an example of the braiding machine process 800 shown in FIG. 9 and is further described below.

Figure 9:
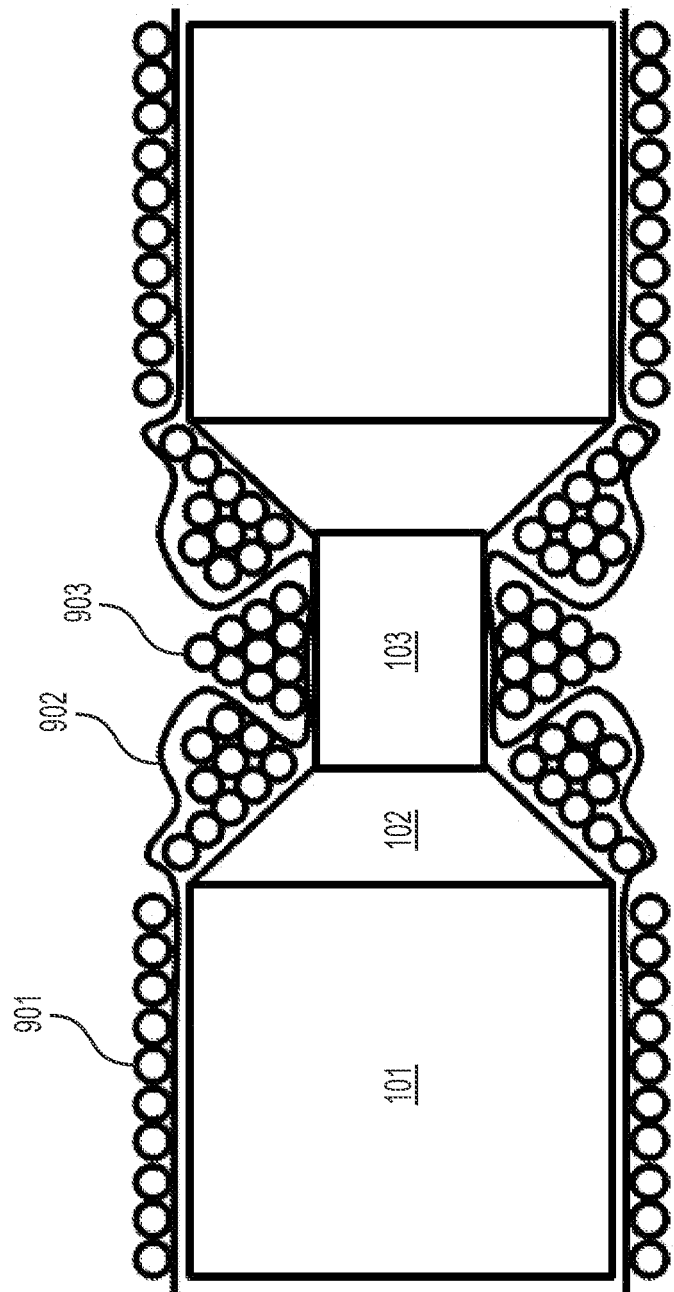
FIG. 9 illustrates a high compaction braided product overbraided over a generally allantoidal preform.

As illustrated in FIG. 9, an embodiment of the high compaction braided structure may be overbraided onto the allantoidal shaped preform described herein. In this embodiment, the high compaction braided product may be first overbraided over section 101 of the preform which may comprise the largest cross-sectional geometry of the preform. Over section 101 of largest cross-sectional geometry of the preform, the tows of the braided structure may be arranged side by side with or without space between them in a low compaction arrangement 901.

Consequently, following the overbraiding of section 101, the transitional section 102 may be overbraided with the high compaction braided product. As section 102 may be overbraided, the tows of the high compaction braided structure may become arranged in such a way that the compaction of the tows increases as the cross-sectional diameter of section 102 decreases, resulting in a section of intermediate, or transitioning compaction 902. In this manner, the braid may conform to section 102 of varying cross-sectional geometry without bunching or wrinkling the braided structure.

Subsequently, after section 102 may be overbraided, section 103 of invariable cross-sectional geometry, smaller than that of section 101, may be overbraided. To account for the difference in cross-sectional diameter between section 101 and 103, the tows within the braided structure may form an area of high compaction 903 of tows in which tows may become arranged over top one another and in which there may be little to no space between tows.

A method illustrating the steps required for overbraiding a preform of complex geometry with a high compaction braided structure, in embodiments herein, may be depicted in FIG. 8. The braiding process 800 may begin in step 801 and a preform may be begun to be overbraided in step 802. As the preform may be overbraided in step 802, the high compaction braided structure may conform to the preform through the rearrangement of tows within the braided structure in step 803. In step 804, the preform may be completely overbraided and the braiding process may end in step 805. Additionally, in embodiments, a succession of preforms may be overbraided before the braiding process ends in step 805.

The high compaction braided structure of the present subject matter may be one example of a braided structure which may allow for the creation of allantoidal shaped braided products which may also have particular utility for the creation of composite parts which must be readily expanded and contracted along the longitudinal axis of the braided structure as well as in the radial and bias directions of the braided structure.

Figure 11:
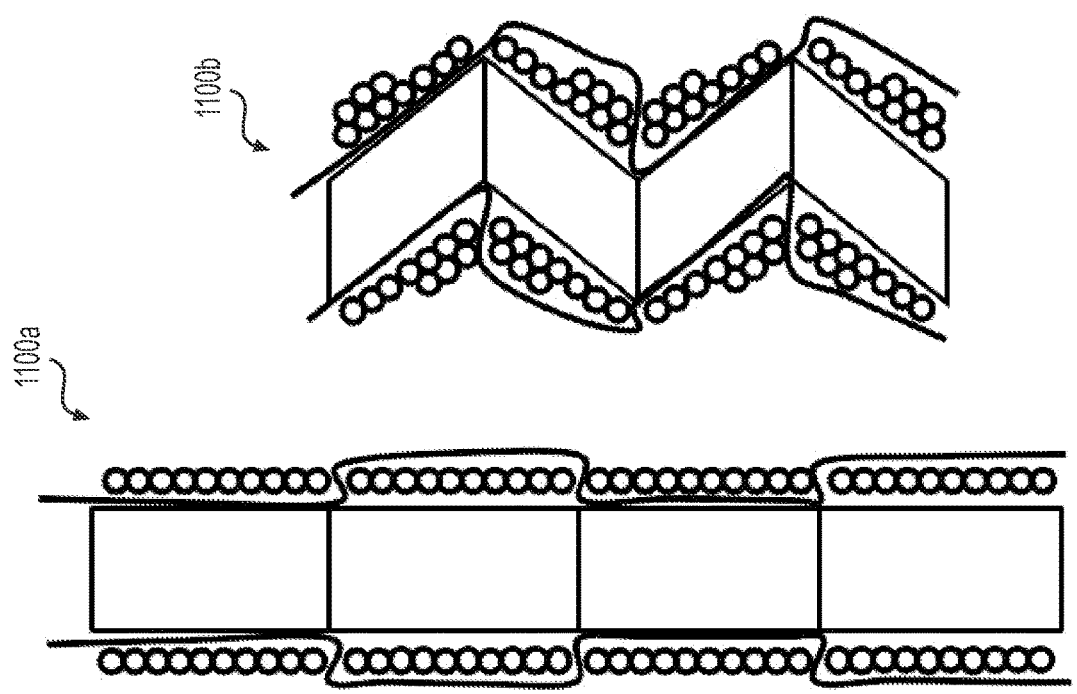
FIG. 11 illustrates a high compaction braided product overbraided onto a generally flabelliform preform.

With regard to FIGS. 10 and 11, in further embodiments of the present subject matter, the high compaction braided structure herein may comprise braided structures including, but not limited to, bellows, those of flabelliform shapes and certain other shapes.

The high compaction braided structure may be overbraided onto a preform like that illustrated in FIG. 10. In this embodiment, the high compaction braided structure may allow for the expansion 1000b and compression 1000a of the bellow-like structure through the rearrangement of compacted tows within the braided structure while still maintaining conformity of the braided structure to the preform. Additionally, the high compaction braided structure described herein may be comprised of a preform like that illustrated in FIG. 11 of a flabelliform shape which may also be expanded 1100a and contracted 1100b through the rearrangement of tows within the high compaction braided structure.

The high compaction braided structure of embodiments herein may have particular utility for braided structures which are desired to undergo physical change as a function of use requirements including, expansion joints, safety shields, ducting and certain other applications.

The high compaction braided structures of embodiments herein may be one example of a braided structure for the creation of allantoidal braided structure. An additional example of a braided structure for the creation of allantoidal braided structures comprises a braided structure comprised of longitudinally varying braid architecture.

In an additional embodiment of a braided structure for the creation of allantoidal braided structures as well as braided structures with complex geometry, the braiding machine and tow carrier devices of embodiments of the high compaction braided structure described herein may comprise a braiding machine for the creation of a braided structure with longitudinally varying architecture.

As described herein, conventional 2×2 braided structures overbraided onto preforms of complex geometry, including allantoidal preforms, in which the ratio of the largest cross-sectional diameter of the preform may exceed three times that of the smallest cross-sectional diameter of the preform, may stretch in locations of large cross-sectional geometry of the preform and become loose in locations of small cross-sectional geometry of the preform. In areas of large cross-sectional geometry of the preform, in which the braided structure may be stretched or distorted, high tension and high bias angles, compared to the nominal, may be induced. Similarly, in areas of small cross-sectional geometry of the preform, in which the braided structure may become loose, low tension and low bias angles may be induced. Further, the braided structure may become wrinkled or bunched due to low tension in areas of small cross-sectional geometry and may not conform to the complex geometry of the preform in areas of small cross-sectional geometry. In embodiments of the present subject matter, it is desired to eliminate these distortions in tension and bias angle and to create braided structures comprised of uniform tension and bias angle along the longitudinal length of preforms of complex geometry.

The braided structure comprised of longitudinally varying architecture of embodiments herein, like the high compaction braided structure, may allow for the formation of braided structures which may be overbraided onto preforms in which the ratio between the largest cross-sectional diameter of the preform to the smallest cross sectional diameter of the preform may be 3 to 1, 5 to 1, 9 to 1 or 10 to 1 in non-limiting examples of the present subject matter.

Allantoidal preforms as illustrated in FIG. 1, discussed herein, may have commercial use as storage tanks and may be comprised of three main sections of variable cross-sectional diameter. Sections 101 of the allantoidal preform of FIG. 1 may comprise a tank while section 103 may comprise a connector. The tanks of the allantoidal preforms may be adapted to endure pressure and the connector may be adapted for use as a flexible gas pressure tube. Each of the tanks may have a first diameter comprising section 101 and each connector may have a second diameter comprising section 103. Section 102 of the allantoidal preform may be described as a transitional portion of the tank located between each tank and each connector comprising the allantoidal preform. Allantoidal preforms may be comprised of a plurality of sections 101, 102 and 103 resulting in the formation of a multi-tank and flexible connector structure which may comprise at least a first tank and a second tank, a cylindrical connector located in between the first and the second tank and a two transitional portions with the first located in between the first tank and the connection and the second located in between the connector and the section tank.

In additional examples of allantoidal preforms which may comprise a first tank and second tank and which may additionally comprise a cylindrical connector in between each tank, section 101 may comprise a first portion while a second portion may comprise a first section 102, section 103 and a second section 102. Additionally, in this example, a third portion may comprise an additional section 101. In further examples of the present subject matter, the second portion may comprise only section 103.

An embodiment of a braided structure comprised of longitudinally varying architecture may be comprised of a 5×5 starting point braid architecture in which five S traveling tow carrier devices may pass under five Z traveling tow carrier devices and over five Z traveling tow carrier devices in a repeating pattern. The braiding machine of an embodiment of the present subject matter may be comprised of enlarged horn disks as described in embodiments of the high compaction braided structure discussed herein. In addition, specialized tow carrier devices may also be employed to reduce the affects of sawing as described in an embodiment of the high compaction braided structure for the creation of allantoidal braided products as well as other braided products of complex geometry.

Additional embodiments of the braiding machine described herein for the creation of a braided structure with longitudinally varying braid architecture may allow for alterations within the braid architecture along the longitudinal axis during the braiding process to eliminate changes in tension and bias angle due to distortions within the braid structure, over the surface of the preform. Further, alterations of braid architecture along the longitudinal axis of the braided structure may be achieved while maintaining the tow materials comprising the braided structure as contiguous.

Conventional braided structures may generally be comprised of singular braid architectures along the longitudinal axis of the braided product. To alter the braid architecture of a conventional braided structure along the longitudinal axis of the braided product, a plurality of individual portions of braided products comprising the desired braid architectures must be spliced, sewn, or otherwise affixed to one another to achieve a braided product with longitudinally varying braid architecture. In these cases, tow materials may not be contiguous within the transitory braid architecture of the braided product, resulting in sections of distorted bias angle, disruption in the braided structure and disruption in the coverage of the braided structure at transition points in which the braid architecture may be altered from one braid architecture to another. Coverage of the braided structure may be defined as fiber density or compaction of tow materials within the braided structure.

The braided structure with longitudinally varying braid architecture of the present subject matter may comprise transitory braid architecture along the longitudinal axis of the braided structure in which there may be a seamless transition between braid architectures in which the tow materials are maintained as contiguous. Maintenance of the tows as contiguous along the longitudinal axis within the braided structure of the present subject matter may be achieved through the removal, or sequester, of tow carrier devices during specific intervals during the braiding process. Further, alterations within the braid architecture of the braided structure of embodiments herein may allow for transitions in the diameter of the braided product. In a non-limiting example of the present subject matter, a 5×5 braid architecture may comprise a larger braid diameter, a larger plurality of tow carrier devices and may conform best to larger cross-sectional diameters of a preform of complex geometry, than small cross-sectional diameters of a preform of complex geometry. The removal, or sequester, of a plurality of tow carrier devices from the 5×5 braiding machine of the present subject matter may result in the formation of a 1×1 braid architecture comprising a fewer number of tow carrier devices and which may conform best to small areas of cross-sectional geometry, as opposed to larger areas of cross-sectional geometry.

In a non-limiting example, an embodiment of the braiding machine of the present subject matter may comprise 120 tow carrier devices for the manufacture of a 5×5 braided structure. During the manufacturing process, ⅕ of these tow carrier devices may be removed, or sequestered, resulting in the creation of a 4×4 braid architecture comprised of 96 remaining tow carrier devices. Subsequently, ¼ of the remaining tow carrier devices may be removed, or sequestered, resulting in the creation of a 3×3 braid architecture comprised of 72 remaining tow carrier devices. Consequently, the removal of tow carrier devices may continue until 24 tow carrier devices remain and a 1×1 braid architecture is achieved. Accordingly, each instance in which tow carrier devices may be sequestered may result in a decrease in the braid diameter of the braided structure of longitudinally varying architecture. Further, the transition in braid architecture, and diameter, along the longitudinal length of the braided product may allow for the same bias angle, tension and braid coverage along the length of the braided structure to be maintained as no distortion within the braided structure may occur. Therefore, it may be understood in embodiments of the present subject matter that a large braid architecture may correspond with large diameters of the braided structure and a small braid architecture may correspond with small diameters of the braided structure.

Additionally, the transitory braid architecture of the braided structure described herein may allow for greater ratios of the largest cross-sectional diameter of the preform to the smallest cross-sectional diameter of the preform to be overbraided without distortion within the braided structure, than the three to one ratio for conventional braided structures. Therefore, a greater variety of preforms with complex geometry may be overbraided than may be achieved with conventional braided structures. For example, in an embodiment of the present subject matter in which the braid architecture may be altered from a 5×5 to a 1×1 braid architecture, a preform comprised of a ratio of the largest cross-sectional diameter of the perform to the smallest cross-sectional diameter of the preform of at least five to one ratio may be overbraided without distortion in the braided structure.

As described herein, the braided structure comprised of longitudinally varying braid architecture of embodiments herein may allow for the creation of a braided structure comprising constant bias angle, constant tension, the maintenance of tow materials comprising the braided structure as contiguous between transitions in braid architecture, maintaining tows as contiguous along the longitudinal axis of the braid and the overbraiding of more complex and widely variable preforms of complex geometry. Further, the braided structure described herein may additionally allow for a uniform braid coverage to be achieved along the longitudinal length of the braided structure. While the high compaction braided structure of embodiments herein required a transitory braid coverage, or compaction of tows within the braided structure, to over braid preforms of complex geometry without distortion, the braided structure with longitudinally varying braid architecture of embodiments herein may maintain a uniform braid coverage along the longitudinal length of the preform to achieve the overbraiding of preforms of complex geometry though alterations within the braid architecture of the braided structure.

FIGS. 12-17 are examples of the braiding machine generally described regarding the braided structures of FIGS. 18-26 and are further described below.

Figure 18:
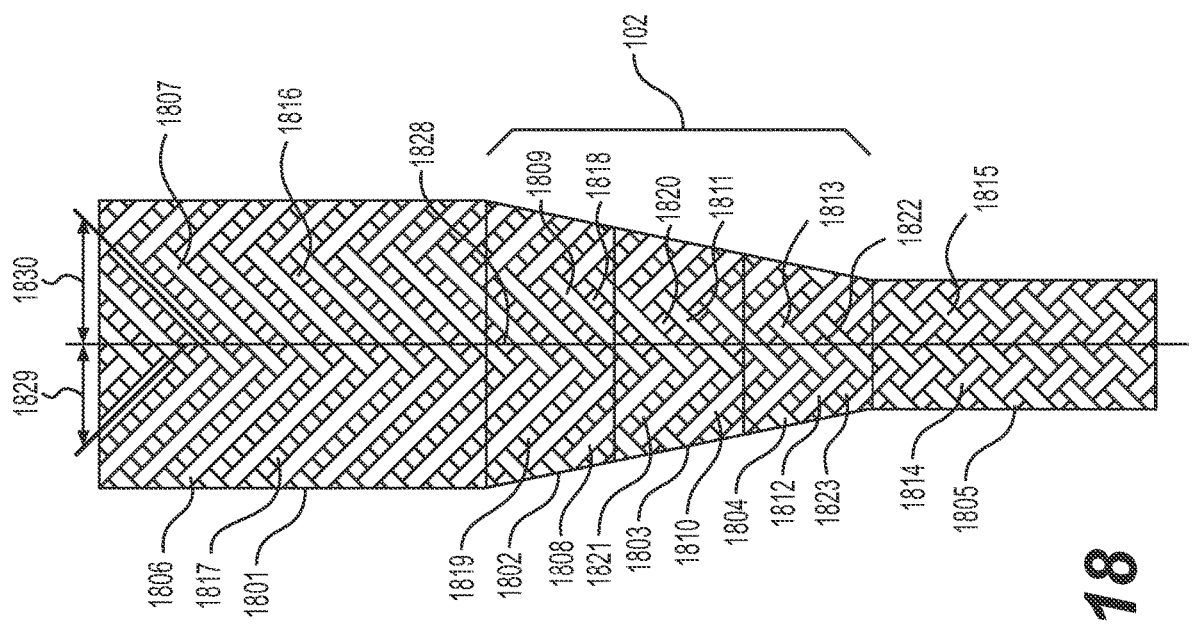
FIG. 18 illustrates the braided structure of the present subject matter comprised of a longitudinally varying braid architecture.

The braided structure with longitudinally varying architecture of the present subject matter is illustrated in FIG. 18.

As previously described herein and illustrated in FIG. 1, section 101 of the allantoidal preform may be overbraided with a 5×5 starting point braid architecture 1801. After the desired longitudinal length of the braided structure of 5×5 braid architecture 1801 may be formed, section 102 of the allantoidal preform may be overbraided. Section 102 of the allantoidal preform may be divided into a plurality of distinct sections of transitory braid architecture including, a 4×4 braid architecture 1802, a 3×3 braid architecture 1803 and a 2×2 braid architecture 1804 section which may be equal or unequal in longitudinal length. Following the overbraiding of section 102, section 101 of the preform may be overbraided with a 1×1 end point braid architecture 1805 to obtain the braided structure with longitudinally varying architecture.

Figure 15:
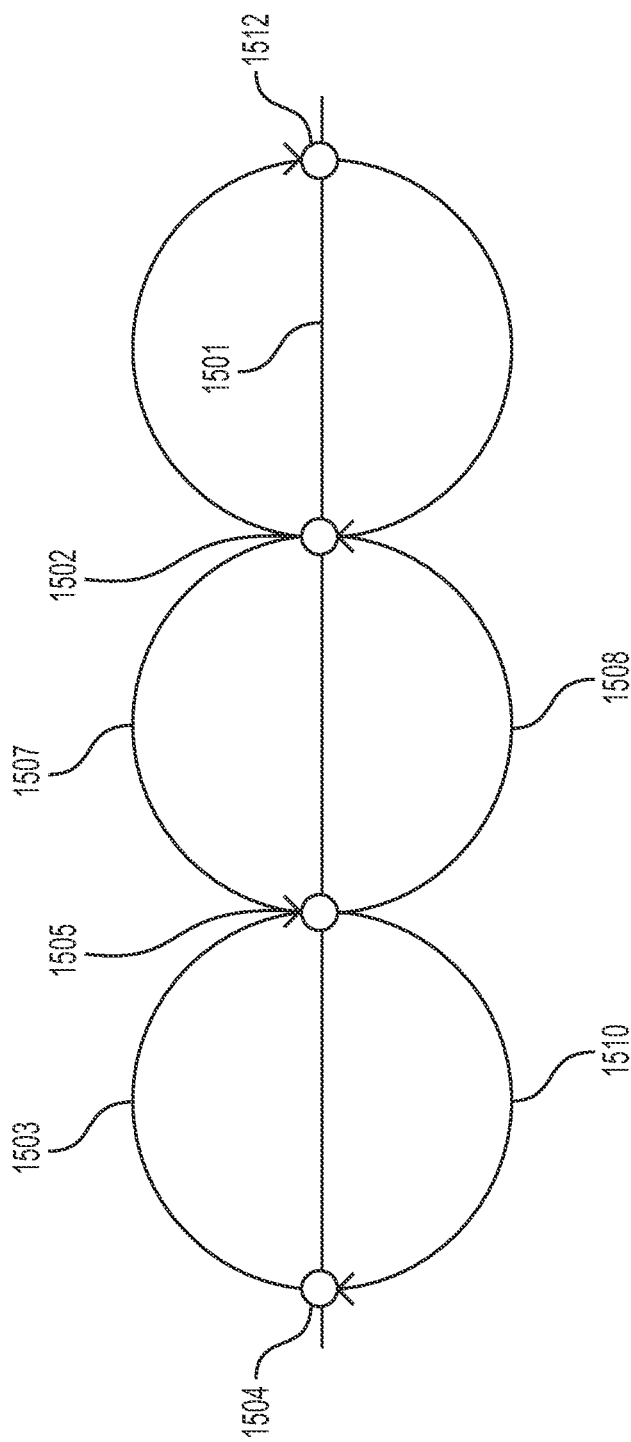
FIG. 15 is illustrative of a simplification of a braiding machine.

Section 1801 of FIG. 18 may comprise a 5×5 braid architecture. Within the 5×5 braid architecture of section 1801 a single S traveling tow 1806 may pass over 5 Z traveling tows 1807 and under 5 Z traveling tows 1807 in a repeating pattern. Further, a single Z traveling tow 1807 may pass under 5 S traveling tows 1806 and over 5 S traveling tows 1806 in a repeating pattern. As described herein, this repeating pattern may be achieved through the movement of tow carrier devices along a braiding machine track circumferentially as well as radially inwards and outwards from the center of the braiding machine. A brief discussion of a simplification of the braiding machine as illustrated in FIG. 15 follows to provide reference for the movement of tow carrier devices around a braiding machine track for the formation of the braided structure of the present subject matter. A continued discussion of FIG. 18 follows that of FIG. 15.

A simplification of the braiding machine of an embodiment of the present subject matter may be illustrated in FIG. 15. A braiding machine may be comprised of a plurality of nodes 1502, 1504, 1505 and 1512, equally dispersed around a braiding machine track, or ring 1501. Tracks traveled by S and Z tow carrier devices may intersect, forming source nodes 1504 and sink nodes 1505. A single node may be a source for one or more S and Z tracks and a sink node for one or more S and Z tracks. A source node 1504 may be described as an event in which a tow carrier device may travel around the outermost track of a braiding machine, farthest from the braiding machine center and a sink node 1505 may be described as an event in which a tow carrier device travels along the innermost track of the braiding machine, closest to the braiding machine center.

A typical 2×2 braiding machine comprised of 120 tow carrier devices may generally be comprised of 60 nodes with an S and Z track intersecting each node. For a first set of two nodes, 1505 and 1502, there may be an S edge 1507 in the S direction and a Z edge 1508 in the Z direction. Between nodes 1505 and 1504, S and Z edges may interchange in such a manner that an S edge 1510 may occur on the inner surface of the braided structure and a Z edge 1503 may occur on the outer surface of the braided structure. Between nodes 1505 and 1502, the S edge 1507 may occur on the outer surface of the braided structure and the Z edge 1508 may occur on the inner surface of the braided structure.

A continued discussion of FIG. 18 with reference to FIG. 15 follows. A single S traveling tow carrier device affixed with a spool of tow material may be transferred along inner 1510 and outer 1507 S edges of a braiding machine track. As a single S traveling tow carrier device may travel along an outer S edge 1507 of a braiding machine track, five Z traveling tow carrier devices affixed with spools of tow materials may travel along an inner Z edge 1508 of the braiding machine track. The S tow carrier device on the outer S edge 1507 may pay out tow material in the bias direction as it passes over the five Z traveling tow carrier devices traveling on an inner Z edge 1508, resulting in the creation of a portion of the tow material 1806 affixed to the spool on the S traveling tow carrier device on the outer surface of the braided structure. Further, this may result in a portion of the tow material 1816 affixed to the spools of the Z traveling tow carrier devices on the inner surface of the braided structure. Conversely, as a single Z traveling tow carrier device may travel along an outer Z edge 1503 of a braiding machine track, five S traveling tow carrier devices affixed with spools of tow materials may travel along an inner S edge 1510 of the braiding machine track. The Z tow carrier device on the outer Z edge 1503 may pay out tow material as it passes over the five S traveling tow carrier devices traveling on an inner S edge 1510, resulting in the creation of a portion of the tow material 1807 affixed to the spool of the Z traveling tow carrier device on the outer surface of the braided structure. This may further result in a portion of the tow material 1817 affixed to the spools of the S traveling tow carrier devices on the inner surface of the braided structure. The pattern of exchange of portions of tow materials on the inner and outer surfaces of the braided structure, or the intertwining of tow materials in a five over five under pattern may result in the formation of a 5×5 braid architecture 1801.

The bias angle 1829 of the braided structure of FIG. 18 may be defined by the angle between any S traveling tow 1806, 1808, 1810, 1812 and 1814 and the longitudinal axis 1828 of the braided structure or the angle 1830 between any Z traveling tow 1807, 1809, 1811, 1813 and 1815 and the longitudinal axis 1828 of the braided structure wherein the angle between any Z traveling tow and the longitudinal axis may be a positive angle and the angle between any S traveling tow and the longitudinal axis may be a negative angle.

As described herein, the 5×5 braid architecture 1801 of the present subject matter may be overbraided over section 101 of the preform of complex geometry without distortion in the braided structure including changes in bias angle, tension and braid coverage. However, in additional embodiments of the present subject matter, the bias angle 1829 and 1830 of the 5×5 braided structures may be transitory along the longitudinal axis 1828 of section 101 of the preform of complex geometry. A braided structure comprised of transitory braid architecture as well as transitory bias angle along section 101 of the allantoidal preform of embodiments of the present subject matter is illustrated in FIG. 18A and is discussed below.

Figure 18A:
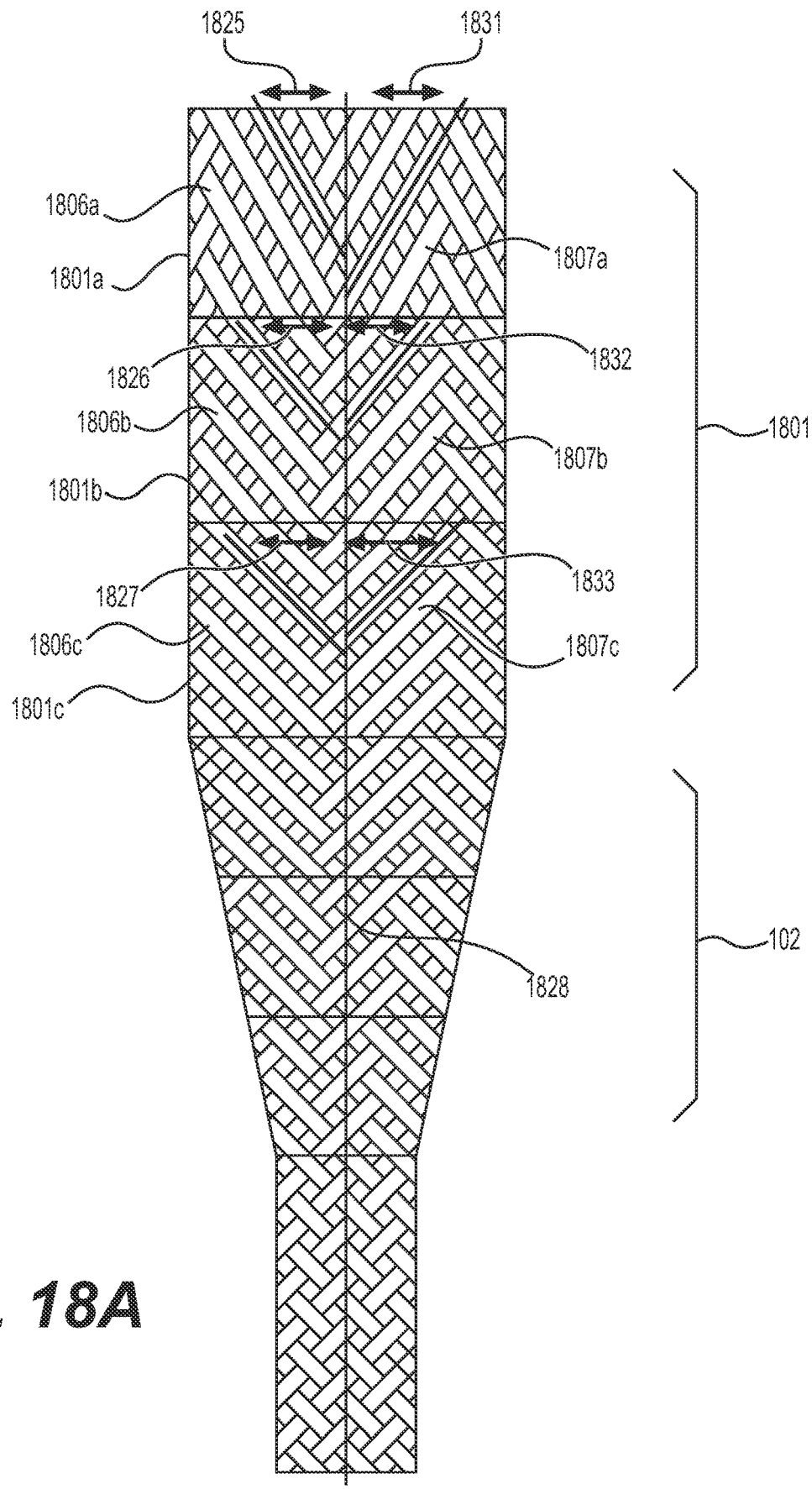
FIG. 18A illustrates the braided structure of the present subject matter comprised of a longitudinally varying architecture which comprises a transitory bias angle within the 5×5 braid architecture.
Figure 19:
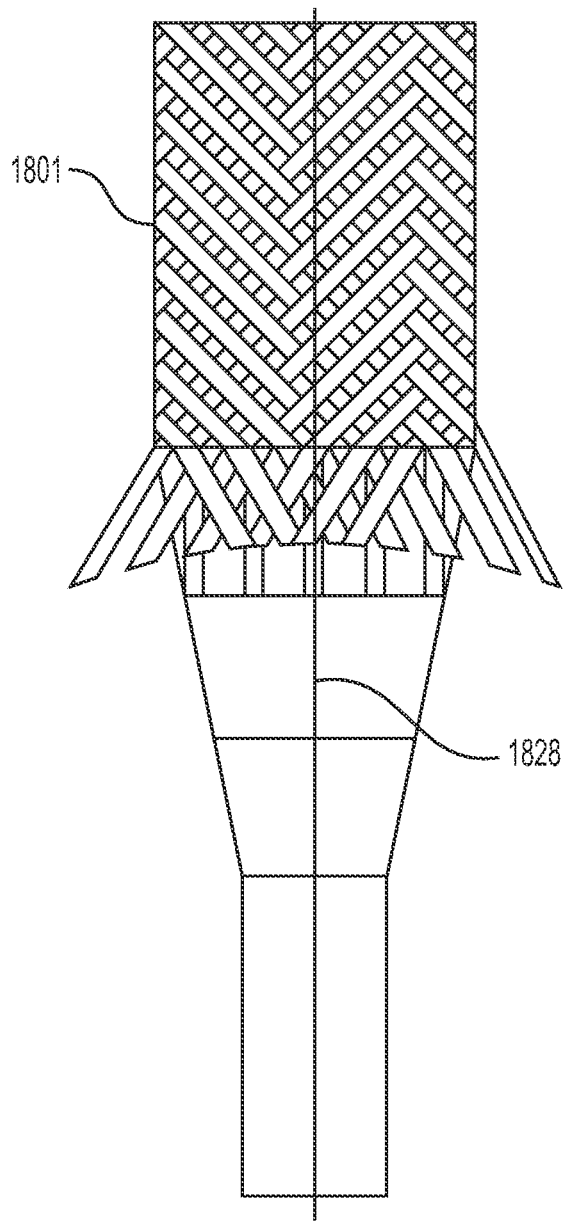
FIG. 19 illustrates a 5×5 braid architecture overbraided over a first section of a preform comprised of large cross-sectional geometry.
Figure 19A:
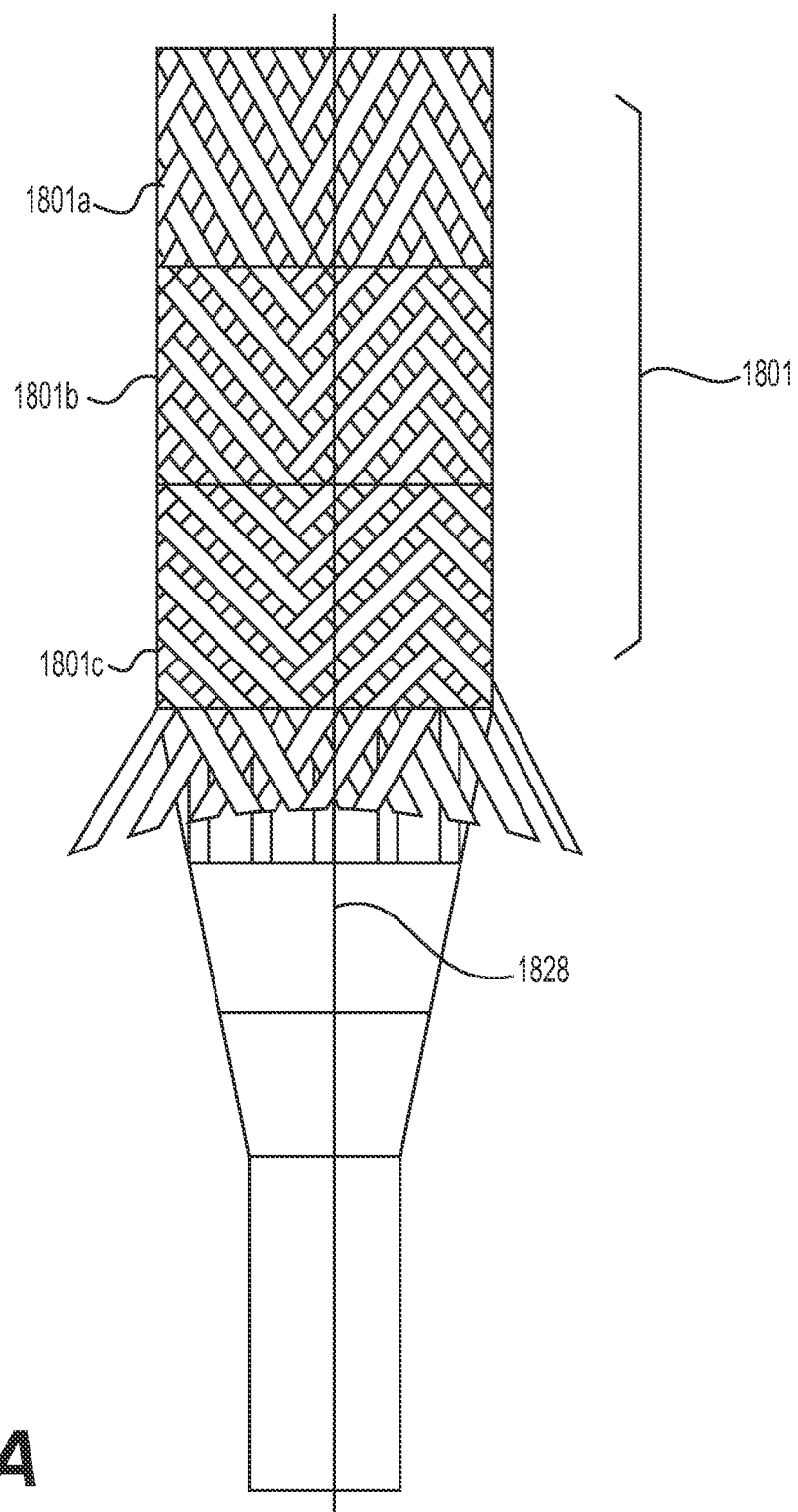
FIG. 19A illustrates a 5×5 braid architecture comprising a transitory bias angle overbraided over a first section of a preform comprised of large cross-sectional geometry

The 5×5 braid architecture 1801 of FIG. 18A may be divided into a plurality of sections 1801a, 1801b and 1801c in embodiments of the present subject matter, each with a different bias angle 1825, 1826, 1827, 1831, 1832 and 1833 with respect to the longitudinal axis 1828 of the braided product. The bias angles of FIG. 18A may be divided into two different groups of positive, 1831, 1832 and 1833, and negative, 1825, 1826 and 1827 angles. Section 1801a may comprise the lowest bias angles 1825 and 1831 along the longitudinal length of the braided product defined by the angle 1825 between any S traveling tow 1806a and the longitudinal axis 1828 of the braided structure or the angle 1828 between any Z traveling tow 1807a and the longitudinal axis 1828 of the braided product. Subsequently, section 1801b of the 5×5 braid architecture may comprise an intermediate bias angle which may transition the bias angle from section 1801a to section 1801c. The bias angle of section 1801b may be defined by the angle 1826 between any S traveling tow 1806b and the longitudinal axis 1828 of the braided product and the angle 1832 between any Z traveling tow 1807b and the longitudinal axis 1828 of the braided structure. Section 1801c may comprise a final section of a plurality of sections of transitory bias angles within the 5×5 braid architecture 1801. The bias angle of section 1801c may be continued throughout sections 102 and 103 of the braided structure, through the transitions in braid architecture from 5×5 1801, to 4×4 1802, to 3×3 1803, to 2×2 1804 and finally 1×1 1805. Further, the bias angle of the braided structure may not be altered until another section 101 of large cross-sectional diameter of the preform may be overbraided with a 5×5 braid architecture 1801. In additional embodiments of the present subject matter, the bias angle of the braided structure with longitudinally varying braid architecture may only be altered along sections of the preform with uniform cross-sectional diameter. The bias angle of section 1801c may be defined by the angle 1827 between any S traveling tow 1806c and the longitudinal axis 1828 of the braided structure or the angle 1833 between any Z traveling tow 1807c and the longitudinal axis 1828 of the braided structure. While FIG. 18A illustrates a braided structure with longitudinally varying braid architecture as well as an increasing transitory bias angle along section 101 of the overbraided preform, it may be understood by one skilled in the art that the bias angle may be decreased along the longitudinal axis of the braided structure in embodiments of the present subject matter. The braided structure of an embodiment of the present subject matter overbraided with only a 5×5 braid architecture comprised of a singular bias angle 1801 is illustrated in FIG. 19 while, an embodiment of the present subject matter comprised of transitory bias angle within the 5×5 braid architecture 1801 overbraided onto an allantoidal preform is illustrated in FIG. 19A.

A discussion of FIG. 18 resumes. Subsequent to the overbraiding of section 101 of 5×5 braid architecture 1801 section 102 of the preform of complex geometry may be overbraided. As described herein, section 102 may comprise a transitory braid architecture which may transition the starting point braid architecture, a 5×5 braid architecture 1801 in embodiments of the present subject matter, to an end point architecture, a 1×1 braid architecture 1805 in embodiments of the present subject matter. In an embodiment of the present subject matter in which the starting point braid architecture may be a 5×5 braid architecture, the first transition in braid architecture to achieve the 1×1 end point braid architecture 1805, of embodiments of the present subject matter, may be from a 5×5 braid architecture to a 4×4 braid architecture 1802. This transition in braid architecture of the present subject matter may be achieved through the sequestration of tow carrier devices from the braiding machine track. The sequester of tow carrier devices, as described herein may result in a decrease in the diameter of the braided structure as well as a decrease in the braid architecture of the braided structure.

A discussion of FIG. 24 which illustrates the removal of tow materials from the braided structure of longitudinally varying braid architecture for the formation of the braided structure of FIG. 18 is as follows. In an embodiment of the present subject matter illustrated in FIG. 24 a 4×4 braid architecture 1802 may be achieved through the sequester of tow carrier devices from the braiding machine track. The sequester of tow carrier devices from the braiding machine track may result in the transference of the tow materials affixed to spools operatively affixed to sequestered tow carrier devices from bias tows traveling around the braiding machine track to axial tows paying out material along the longitudinal axis of the braided structure on the outer or the inner surface of the braided structure. In an embodiment of the present subject matter illustrated in FIG. 24 the sequestered tows may pay out axial tow material along the longitudinal axis 1828 of the braided structure on the inner surface of the braided structure.

In a further example of the present subject matter, tow carrier devices may be sequestered from a main braiding machine track to a secondary, or a plurality of secondary braiding machine tracks concentrically arranged in relation to the main braiding machine track, wherein the tows operatively affixed to the tow carrier devices may not be converted from bias tows, to axial tows. In this example, sequestered tow carrier devices may intertwine with one another to form a second layer of braided structure on the interior or exterior surface of the braided structure formed by the main braiding machine ring and may therefore be maintained as bias tows.

Figure 24:
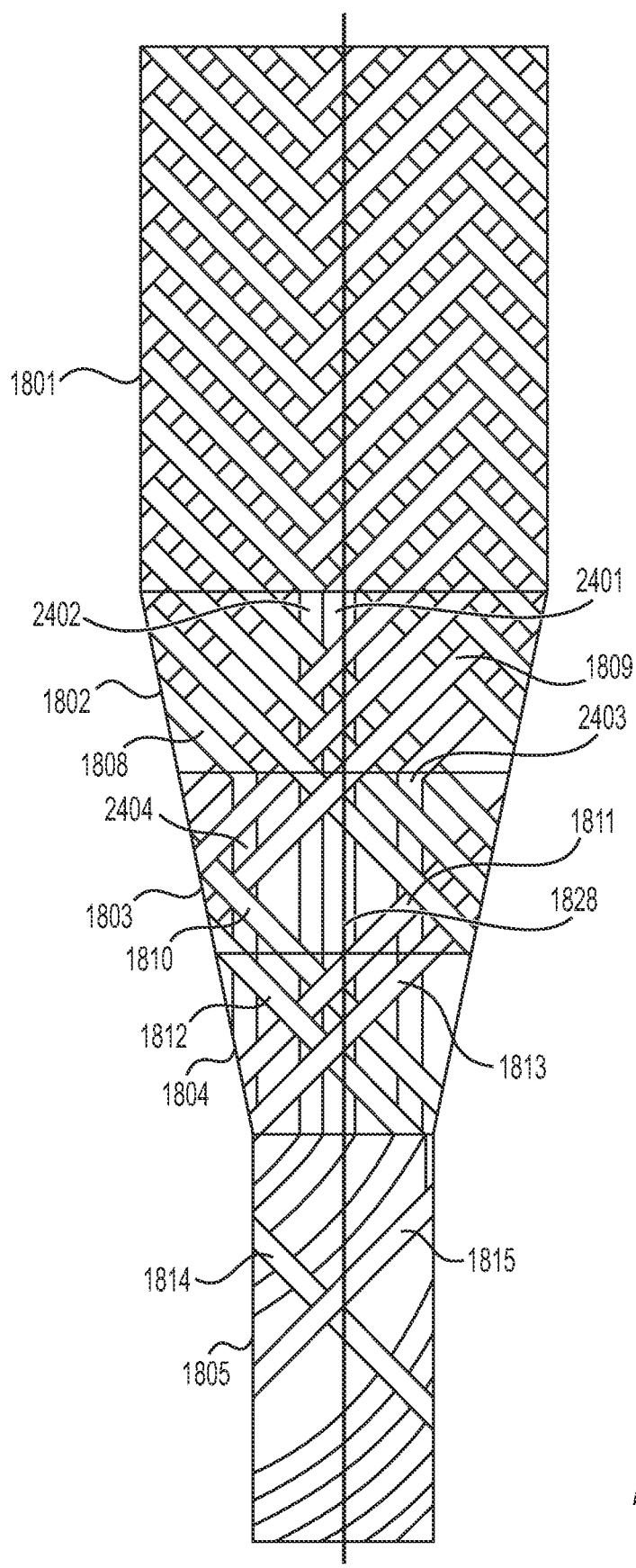
FIG. 24 illustrates the braided structure with longitudinally varying architecture illustrating the sequestration of tows in which tows may be wrapped around a specific section of the allantoidal preform.

While FIG. 24 is illustrative of the removal of tow carrier devices from the braided structure of the present subject matter comprised of a longitudinally varying architecture, in embodiments of the present subject matter, gaps illustrated in the braided structure of FIG. 24 may not be present, as illustrated in FIGS. 18 and 18A.

Upon the transition in braid architecture from a 5×5 braid architecture 1801 to a 4×4 braid architecture 1802, a plurality of tow carrier devices may be sequestered. As illustrated in FIG. 24, upon the sequester of a plurality of S and Z tow carrier devices, the plurality of tow materials 2401 and 2402 affixed to the sequestered tow carrier devices may transition from bias S 1808 and Z 1809 traveling tows to S 2402 and Z 2401 axial tows paying out on the inner surface of the braided structure. While sequestered, tow materials paying out material along the longitudinal axis of the braided structure 1828 may not interact with the braided structure. The transference of tow materials from bias tows to axial tows may reduce the quantity of tow carrier devices in the braiding machine track and therefore may result in an alteration in the braid architecture of the braided structure from a 5×5 braid architecture 1801 to a 4×4 braid architecture 1802.

Figure 20:
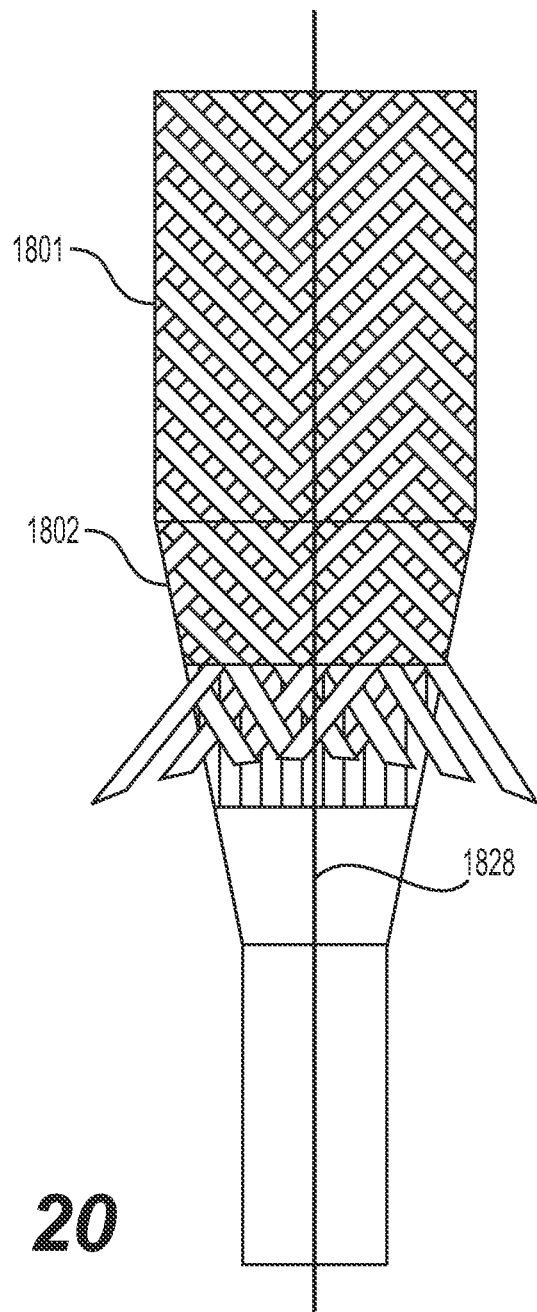
FIG. 20 illustrates a 5×5 braid architecture overbraided over a first section of a preform comprised of large cross-sectional geometry and a 4×4 braid architecture overbraided over a second section of the preform.

A 4×4 braid architecture 1802 may generally be comprised of a repeating pattern in which four S traveling tow carrier devices may pass over four Z traveling tow carrier devices and under four Z traveling tow carrier devices and in which four Z traveling tow carrier devices may pass under four S traveling tow carrier devices and over four S traveling tow carrier devices. With regard to FIGS. 15, 18 and 24, within a 4×4 braid architecture, a single S traveling tow carrier device traveling on an outer S edge 1507 may pass over four Z traveling tow carrier devices traveling on inner Z edges 1508. As the single S traveling tow carrier device may pass over four Z traveling tow carrier devices, a portion of S tow material 1808 may be formed on the outer surface of the braided structure while portions 1819 of the Z traveling tows may be formed on the inner surface of the braided structure. Additionally, a single Z traveling tow carrier device traveling on an outer Z edge may pass over four S traveling tow carrier devices traveling on inner S edges 1510. As the single Z traveling tow carrier device may pass over the four S traveling tow carrier devices, a portion of Z tow material 1809 may be formed on the outer surface of the braided structure while portions 1818 of the S traveling tows may be formed on the inner surface of the braided structure. The intertwining of tow materials and the exchange of tow carrier devices from inner and outer edges of the braiding machine track may result in the formation of a 4×4 braid architecture 1802. Further, the bias angles 1829 and 1830, of the 4×4 braid architecture of section 1802 may comprise the angle between any S traveling tow 1808 and the longitudinal axis 1828 of the braided structure 1828 or any Z traveling tow 1809 and the longitudinal axis 1828 of the braided structure. While the 4×4 braid architecture of the present subject matter may be braided, axial tows 2401 and 2402 may continue to pay out material along the longitudinal axis of the braided structure on the inner surface of the braided structure. The braided structure of the present subject matter overbraided with both a 5×5 1801 and 4×4 1802 braid architecture is illustrated in FIG. 20.

Following the overbraiding of a first portion of section 102, in a continued discussion of FIGS. 15, 18 and 24, the braid architecture may again be decreased from a 4×4 braid architecture 1802 to a 3×3 braid architecture 1803 to continue to transition the 5×5 starting point braid architecture 1801 to the 1×1 end point braid architecture 1805. The alteration in braid architecture from the 4×4 braid architecture 1802 to the 3×3 braid architecture 1803, like the transition in braid architecture from a 5×5 braid architecture 1801 to a 4×4 braid architecture 1802 may be achieved through the sequestration of tow carrier devices. Additionally, the bias angle of the braided structure may be maintained from the 4×4 braid architecture 1802 to the 3×3 braid architecture 1803. The bias angle of the 3×3 braid architecture 1803 region of section 102 may be defined as the angles 1829 and 1830, between any S traveling tow 1810 and the longitudinal axis 1828 of the braided structure or the angle between any Z traveling tow 1811 and the longitudinal axis 1828 of the braided structure.

A 3×3 braid architecture may be achieved through the transference of a plurality of S and Z traveling tows 2403 and 2404 from bias tows to axial tows within the braided structure. At the transition from the 4×4 braid architecture 1802 to the 3×3 braid architecture 1803 a plurality of S 2404 and Z 2403 tows operatively affixed to spools affixed to tow carrier devices may be sequestered and may transition from bias tows to axial tows, resulting in a decrease of tow materials within the braiding machine track and therefore altering the braid architecture of the braided structure from a 4×4 braid architecture to a 3×3 braid architecture. Further, the diameter of the braided product may again be reduced to conform to the preform of complex geometry and to maintain bias angle and tension within the braided structure.

Figure 21:
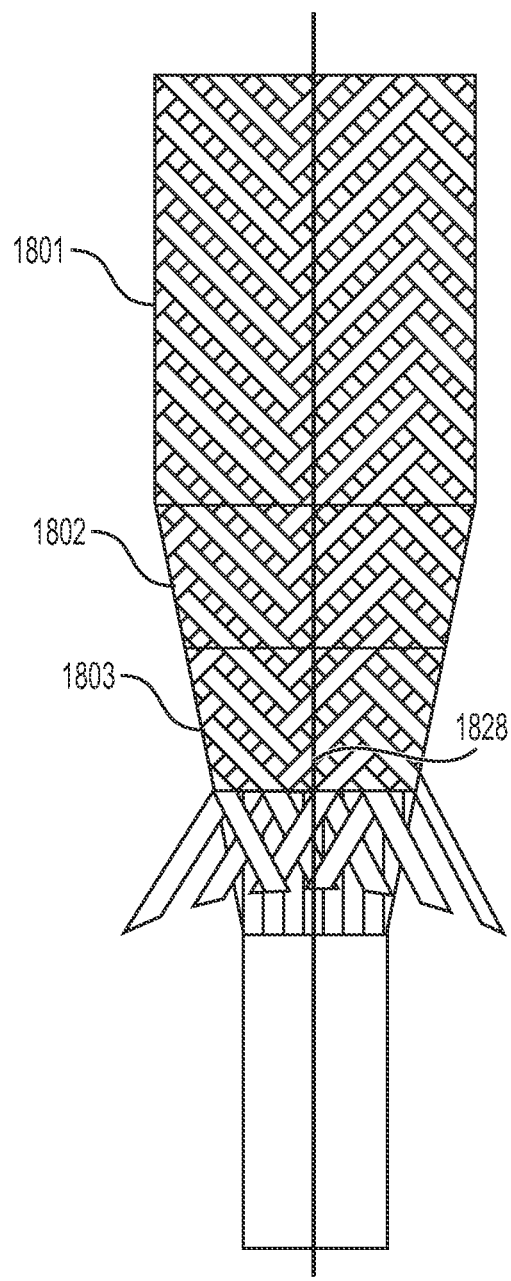
FIG. 21 illustrates a 5×5 braid architecture overbraided over a first section of a preform comprised of large cross-sectional geometry, a 4×4 braid architecture overbraided over a second section and a 3×3 braid architecture overbraided over a third section of the preform.

A 3×3 braid architecture may be comprised of a repeating pattern in which three S traveling tow carrier devices may pass over three Z traveling tow carrier devices and under three Z traveling tow carrier devices and in which three Z traveling tow carrier devices may pass under three S traveling tow carrier devices and over three S traveling tow carrier devices in a repeating pattern. A 3×3 braid architecture 1803 may be formed in a manner such that a single S traveling tow carrier device affixed with a spool of tow material may travel along an outer S edge 1507 and pass over three Z traveling tow carrier devices traveling on an inner Z edge 1508. As the S traveling tow carrier device may pass over three Z traveling tow carrier devices, a portion of S tow material 1810 may be formed on the outer surface of the braided structure while portions of Z traveling tow material 1821 may be formed on the inner surface of the braided structure. Further, a single Z traveling tow carrier device may travel along an outer Z edge 1503 and may pass over three S traveling tow carrier devices traveling on an inner S edge 1510. Additionally, as the Z tow carrier device may pass over three S traveling tow carrier devices a portion of Z tow material 1811 may be formed on the outer surface of the braided structure while portions of the S traveling tows 1820 may be formed on the inner surface of the braided structure. The intertwining of S and Z tow materials may continue to form a 3×3 braid architecture 1803. During the formation of the 3×3 braid architecture 1803 axial tows 2401, 2402, 2403 and 2404 may continue to pay out material along the longitudinal axis 1828 of the braided structure. The braided structure of the present subject matter comprising a 5×5 1801, a 4×4 1802 and a 3×3 1803 braid architecture is illustrated in FIG. 21.

Following the braiding of a predetermined longitudinal length of 3×3 braid architecture 1803, in a continuing discussion of FIGS. 15, 18 and 24, the braid architecture may again be altered in an additional step to continue to transition the starting point braid architecture, a 5×5 braid architecture 1801, to a 1×1 end point braid architecture 1805. In this step, the braid architecture may be altered from a 3×3 braid architecture 1803 to a 2×2 braid architecture 1804. Like the transitions between previous braid architectures comprising the braided structure, the transition in braid architecture in this step of the braiding process may be achieved through the sequester of tow carrier devices and the transference of bias tow materials to axial tow materials, reducing the quantity of tow carrier devices in the braiding machine track and resulting in a decrease in braid diameter. The bias angles, 1829 and 1830, comprising the 3×3 braid architecture 1803 may be maintained within the 2×2 braid architecture 1804 and may be defined as the angle between any S traveling tow 1812 and the longitudinal axis 1828 of the braided structure or the angle between any Z traveling tow 1813 and the longitudinal axis of the braided structure 1828. During the formation of the 2×2 braid architecture all sequestered tow materials may continue to pay out material axially along the longitudinal axis of the braided structure along the inner surface of the braided structure.

Figure 22:
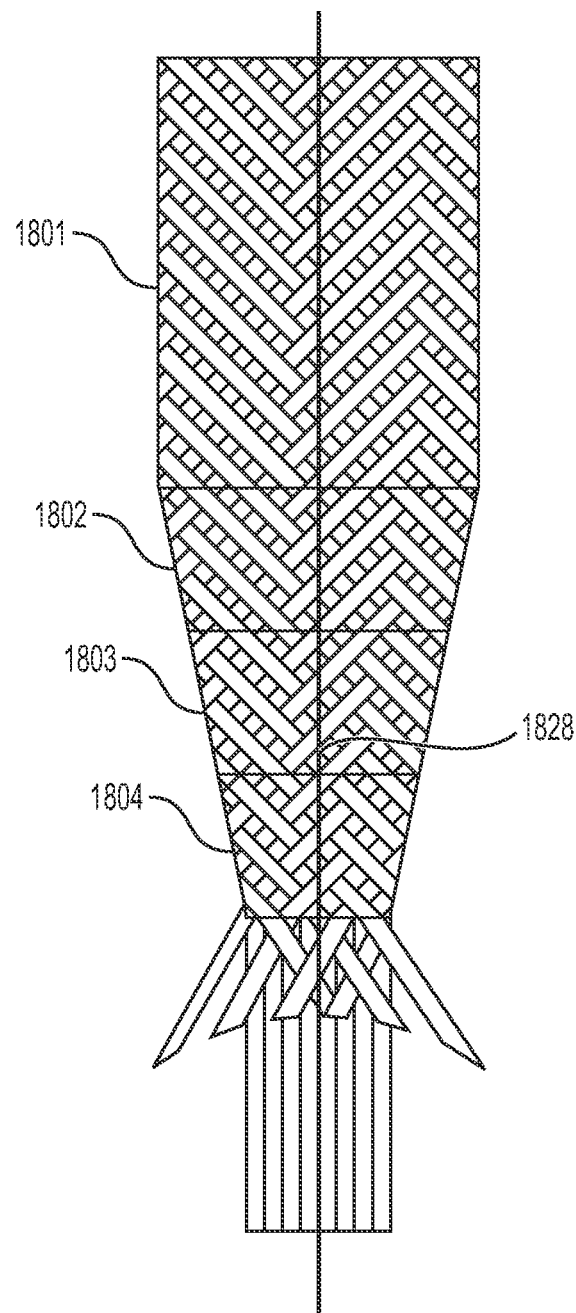
FIG. 22 illustrates a 5×5 braid architecture overbraided over a first section of a preform comprised of large cross-sectional geometry, a 4×4 braid architecture overbraided over a second section, a 3×3 braid architecture overbraided over a third section of the preform, and a 2×2 braid architecture overbraided over a fourth section of the preform.

A 2×2 braid architecture may be comprised of a repeating pattern in which two S traveling tow carrier devices may pass over two Z traveling tow carrier devices and under two Z traveling tow carrier devices and in which two Z traveling tow carrier devices may pass under two S traveling tow carrier devices and over two S traveling tow carrier devices in a repeating pattern. A 2×2 braid architecture may be formed such that a single S traveling tow carrier device traveling on an outer S edge 1507 may pass over two Z traveling tow carrier devices traveling on an inner Z edge 1508 resulting in the formation of a portion 1812 of S tow material forming on the outer surface of the braided structure and the formation of portions 1823 of Z tow material on the inner surface of the braided structure. Further, a single Z traveling tow carrier device traveling on an outer Z edge 1503 may pass over two S traveling tow carrier devices traveling on inner S edges 1510 resulting in the formation of portions 1813 of Z tow material formed on the outer surface of the braided structure and portions of S tow material 1822 formed on the inner surface of the braided structure. The intertwining of tow materials in this manner may result in the formation of a 2×2 braid architecture 1804. FIG. 22 illustrates an allantoidal preform overbraided with 5×5 1801, 4×4 1802, 3×3 1803 and 2×2 1804 braid architectures along the longitudinal axis 1828 of the braided structure.

Following the overbraiding of the preform of complex geometry with the desired longitudinal length of 2×2 braid architecture 1804, in a continued discussion of FIGS. 15, 18 and 24, the final transition in braid architecture to achieve the 1×1 end point braid architecture of embodiments of the present subject matter may occur. This transition may be achieved through the sequester of a final plurality of tow carrier devices from the braiding machine track, resulting in a final quantity of tow carrier devices comprised within the braiding machine track which may interact to form a 1×1 brad architecture 1805, a decrease in the diameter of the braided product, and the transition of a plurality of bias tow materials to axial tow materials. Upon the transition in braid architecture from a 2×2 braid architecture 1804 to a 1×1 braid architecture 1805 all tows sequestered during the formation of the braided structure with longitudinally varying braid architecture may continue to pay out material axially along the longitudinal axis of the braided structure. However, subsequent to the final sequestration of tow carrier devices from the braiding machine track and during the formation of the 1×1 end point braid architecture, all axial tow materials may be helically wrapped around section 103 of the preform as described herein. The helical wrapping of tow materials around section 103 of the allantoidal preform of embodiments of the present subject matter is illustrated in FIG. 24.

Figure 23A:
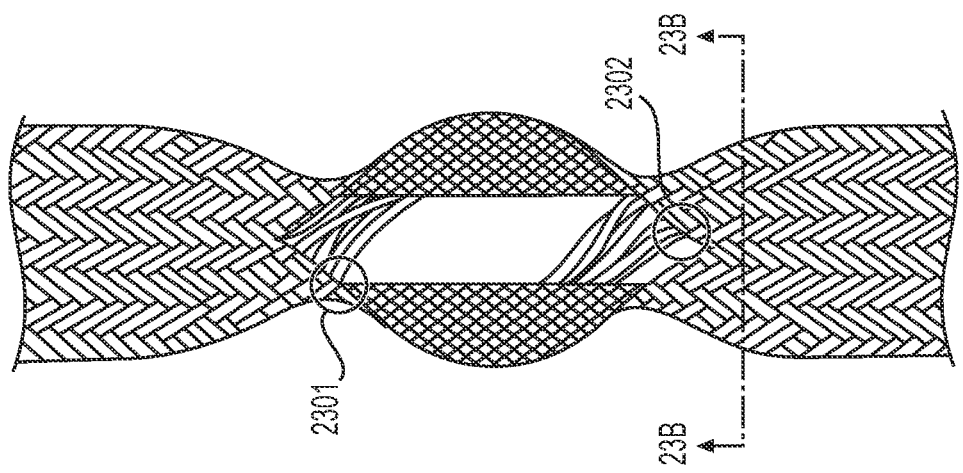
Figure 23B:
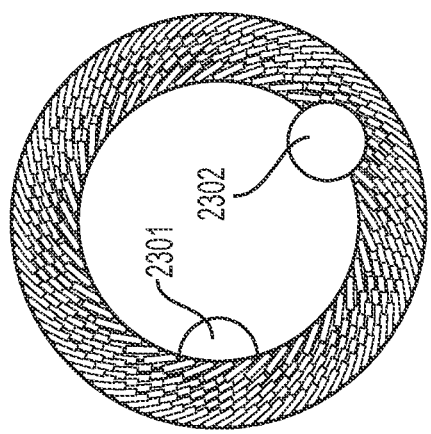
FIG. 23B illustrates a cross section of the preform and braided structure of the present subject matter depicting removal and reintroduction points of a tow.

The helical wrapping of tow materials around section 103 of FIG. 1 as illustrated in FIG. 24 allows for section 103 of the allantoidal preform to be flexed into a variety of different angular positions. FIG. 23A is additionally illustrative of the helical wrapping of tows around section 103 illustrated in FIG. 1 of the allantoidal preform. As illustrated in FIG. 23A, a single tow may be removed from a plurality of intertwining bias tows at a removal point 2301 on the cross-section of the braided structure. Subsequently, the removed tow may be reintroduced back into the braided structure at a reintroduction point 2302 on the cross-section of the braided structure and may intertwine again with the bias tows. A tow which is removed at a removal point 2301 from the plurality of intertwining bias tows may be helically wrapped around the surface of the preform and reintroduced to the braided structure at a reintroduction point 2302. As a result of the helical wrapping of the removed tow, the reintroduction point 2302 may be located at an angular displacement from the removal point 2301, as depicted in FIG. 23B, and may further be displaced along the longitudinal axis of the braided structure. In additional embodiments of the present subject matter, the reintroduction point 2302 may be located at the same angle as the removal point 2301 but may still be displaced along the longitudinal axis of the braided structure. FIG. 23B is illustrative of a cross section of the braided structure and preform and depicts the angular displacement of the removal 2301 and reintroduction 2302 points. Additionally, the removed tow may be spirally wrapped at a positive or negative angle, which may be envisioned as a third bias angle, with respect to the longitudinal axis of the braided structure.

As previously discussed in the specification herein allantoidal preforms may be comprised of a plurality of tanks for the creation of a multi-tank and flexible connector structure, flexible connectors and transitional portions in repetitive patterns along the longitudinal axis; wherein an allantoidal preform comprised of at least two tanks may comprise a series of a first tank, a second tank, a connector located in between the first and second tank and two transitional portions such that the first transitional portion may be located between the first tank and the connector and the second may be located between the connector and the second tank. The helical wrapping of sequestered tow materials allows for flexibility within the braided structure such that the connector may have a radius of curvature and that the tanks comprising the allantoidal preforms may be arranged non-collinearly. The non-collinear arrangement of allantoidal preforms is illustrated in FIG. 26 which will be discussed below.

The flexing of section 103 allows for a non-collinear arrangement of allantoidal preforms of the present subject matter as illustrated in FIG. 26. FIG. 26 is illustrative of a flexed connector 2604 comprising a radius of curvature 2606 in which a first tank 2603 may have a first longitudinal axis 2602 and a second tank 2605 may have a second longitudinal axis 2601 and the flexed connector 2604 may be repositioned within a range of the radius of curvature 2606 such that the first tank 2603 and the second tank 2605 are adaptable to be repositioned wherein at least the first tank longitudinal axis 2602 or the second tank longitudinal axis 2601 is oriented at a plurality of bias directions with respect to the longitudinal axis 1828.

Figure 25:
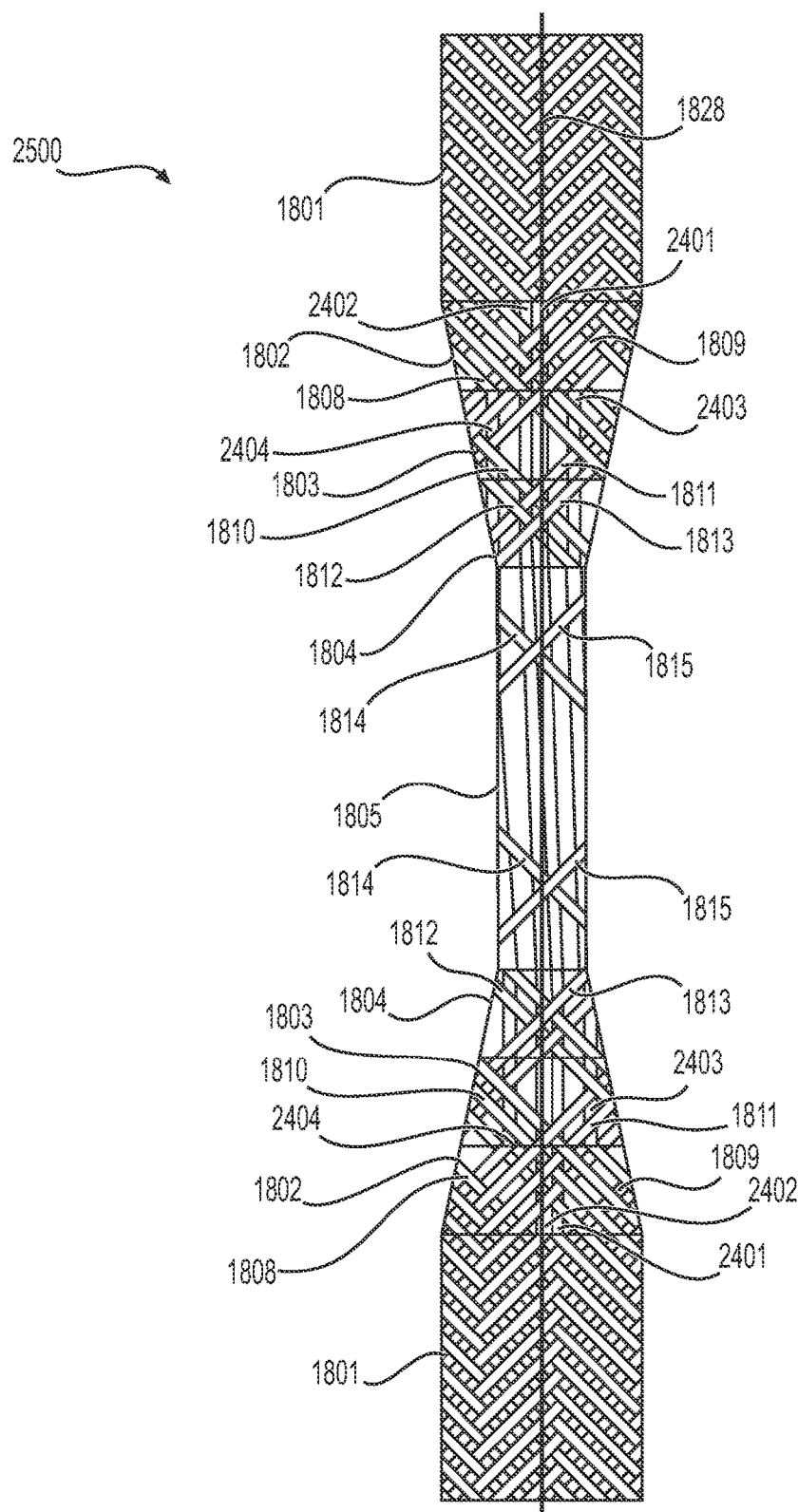
FIG. 25 illustrates the braided structure with longitudinally varying architecture illustrating the removal and introduction of tows within the braided structure.

If the helical wrapping of tows were omitted in this step of the braiding process, axial tow materials may continue to pay out material along the longitudinal axis of the braided structure as illustrated in FIG. 25. As the axial tows, 2401, 2402, 2403 and 2404, may continue to form along the surface of the preform, the longitudinal length of the tows along section 103 of FIG. 1 may be similar. The axial tows of similar length along section 103 may result in a rigid braided structure along section 103 of the allantoidal preform, in which only a collinear arrangement of allantoidal preforms may be achieved.

In a continuing discussion of FIGS. 15, 18 and 24, the 1×1 end point braid architecture 1805 of section 103 of the allantoidal preform may be comprised of a repeating pattern such that one S traveling tow carrier device may pass over one Z traveling tow carrier device and under one Z traveling tow carrier device and in which one Z traveling tow carrier device may pass under one S traveling tow carrier device and over one S traveling tow carrier device in a repeating pattern. The 1×1 end point braid architecture 1805 may be formed such that one S tow carrier device traveling on an outer S edge 1507 may pass over one Z tow carrier device traveling on an inner Z edge 1508 forming a portion of S traveling tow material 1814 on the outer surface of the braided structure and a portion of Z traveling tow material on the inner surface of the braided structure. Further, one Z tow carrier device traveling on an outer Z edge 1503 may pass over one S tow carrier device traveling on an inner S edge 1510 forming a portion of Z tow material 1815 on the outer surface of the braided structure and a portion of S tow material on the inner surface of the braided structure. This intertwining of tow materials may result in the formation of a 1×1 braid architecture 1805.

Once a 1×1 end point braid architecture may be achieved along section 103 of FIG. 1, the braiding process may continue until a juncture comprising the allantoidal preform between sections 103 and 102 of the preform, adjacent to a subsequent section 101 of the allantoidal preform, may be reached. At this juncture illustrated in FIG. 25, it may be desired to increase the 1×1 braid architecture to a 5×5 braid architecture to overbraid sections 102 and 101 of the allantoidal preform. In this case, the starting point braid architecture, the 1×1 braid architecture 1805 may be increased to a 5×5 end point braid architecture 1801 through the addition of tow carrier devices into the braiding machine track resulting in the transference of axial tow materials into bias tow materials. As the transitory braid architecture of section 102 is overbraided, a plurality of axial tow materials 2401, 2402, 2403, 2404 may be introduced back into the braiding machine track upon each transition in braid architecture such that upon the final transition in braid architecture from a 4×4 braid architecture 1802 to the 5×5 end point braid architecture 1801, all axial tows previously paying out tow material along the inner surface of the braided structure 2500 may be transitioned to bias tows and all tow materials may intertwine to from the 5×5 braid architecture 1801 of embodiments of the present subject matter. As illustrated in the braided structure 2500 of FIG. 25, upon the transition in braid architecture from a 3×3 braid architecture 1803 to a 4×4 braid architecture 1802, axial tows 2403 and 2404 may be transitioned into bias tows in which axial tow 2403 may become an S traveling bias tow and axial tow 2404 may become a Z traveling bias tow. Further, illustrated in FIG. 25, axial tow 2401 may be transitioned into an S bias tow while axial tow 2402 may be transitioned into a Z traveling bias tow.

The braiding process may then repeat such that the starting point braid architecture may be a 5×5 braid architecture and the end point braid architecture may be a 1×1 braid architecture.

The braiding machine illustrated in FIGS. 12-17 for the formation of the braided structure of FIGS. 18-26 will be discussed below. The braiding machine, illustrated in FIG. 12, of embodiments herein for the creation of a braided structure with longitudinally varying architecture may be affixed with a method of sequestering tow carrier devices from the standard braiding machine track, or the outer braiding machine track 1203, to transition tow materials from bias tows to axial tows. Further, the outer braiding machine track 1203 may be affixed with a method to alter the standard outer braiding machine track 1203 to allow for the creation of a plurality of sequestering or acquisition tow carrier device tracks which may enable transfer of tow carrier devices from the outer braiding machine track 1203 to tow carrier sequestering devices affixed to a sequester ring 1212. Tow carrier sequestering devices may facilitate the removal of tow carrier devices to achieve the transitory braid architecture of embodiments of the present subject matter through the conversion of tow materials between bias and axial tows while maintaining the tow materials as contiguous.

In additional examples herein, the tow materials operatively affixed to sequestered tow carrier devices may be maintained as bias tows wherein in place of a sequester ring 1212, the braiding machine of examples herein may comprise an additional braiding machine ring such that tow carrier devices may be removed from the outer braiding machine track 1203 to an inner braiding machine track, or a braiding machine track circumferentially arranged within or outside of the outer braiding machine track 1203. In this example during the braiding process, an additional layer of braid may be formed on the interior or exterior surface of the braided structure formed by the outer braiding machine track 1203.

Figure 12:
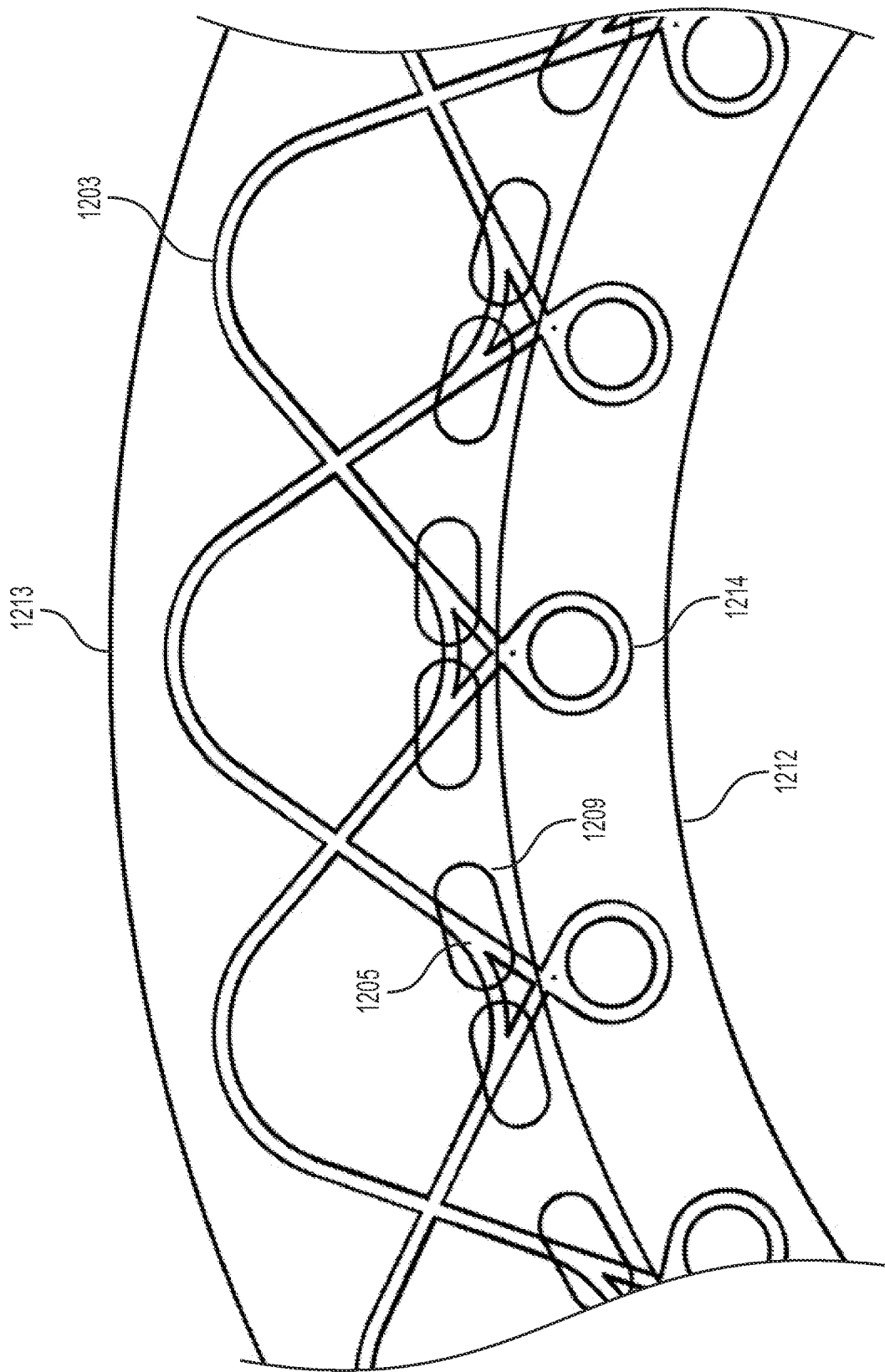
FIG. 12 is illustrative of a partial braiding machine ring and sequester ring of embodiments of the braiding machine herein.
Figure 13:
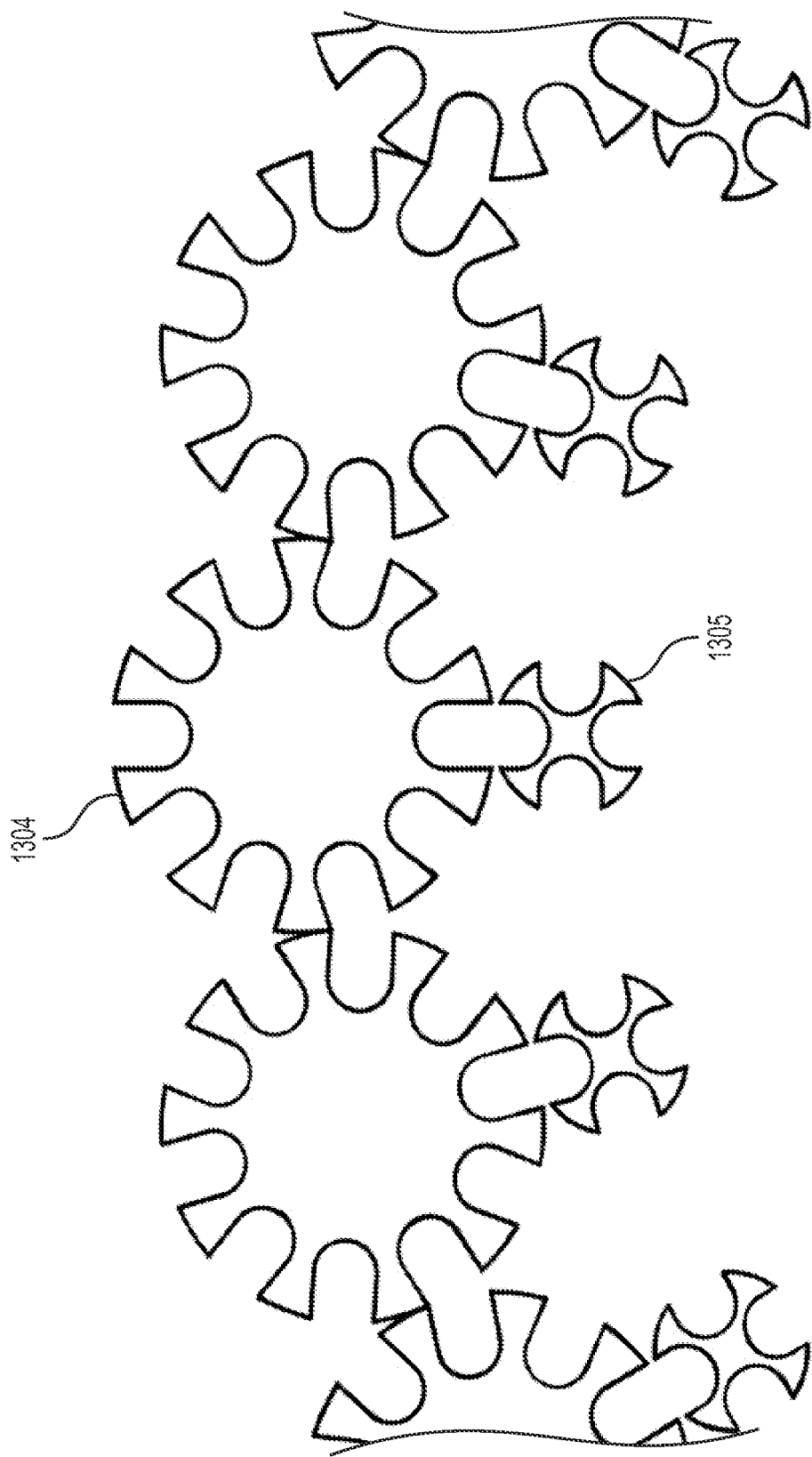
FIG. 13 illustrates a plurality of sequester disks and horn disks.
Figure 14:
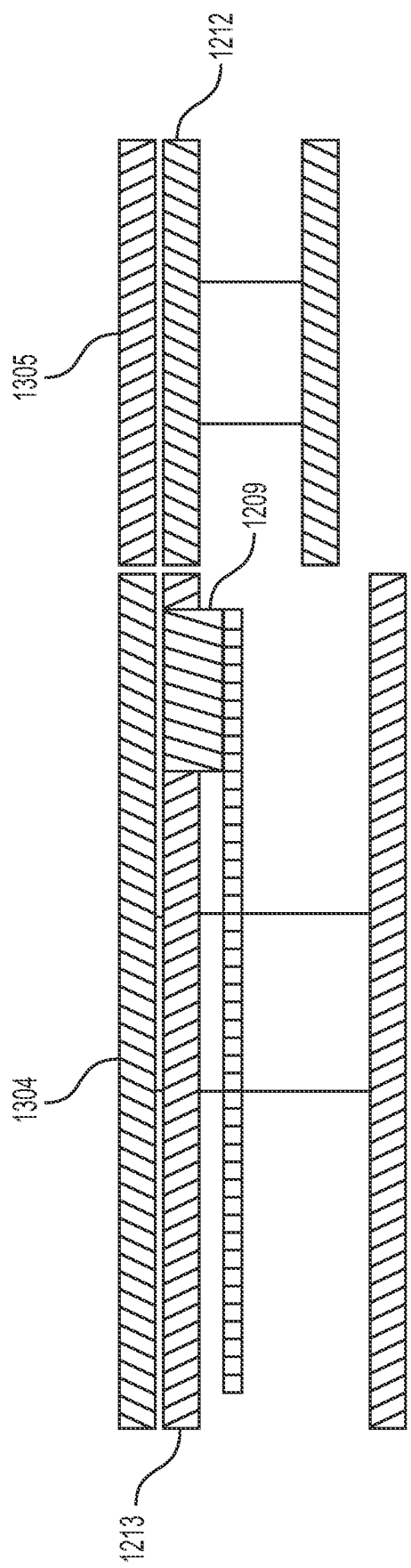
FIG. 14 illustrates a cross-sectional view of the braiding machine of the present subject matter.

The formation of an allantoidal braided structure comprised of longitudinally varying braid architecture, illustrated in FIG. 18, which may transition between starting and ending braid point architectures of 5×5 1801 and 1×1 1805 braid architectures may be created with a braiding machine, of which several components are illustrated in FIG. 13, comprised of 24 enlarged horn disks 1304 as described herein as well as 120 specialized tow carrier devices which may reduce the effects of sawing. The braiding machine of the present subject matter may be viewed in FIGS. 12, 13, 14, 15, 16 and 17. The braiding machine, partially illustrated in FIGS. 12 and 13 and the cross-section of which is illustrated in FIG. 14, of the present subject matter may further be comprised of an outer braiding machine ring 1213, an sequester ring 1212, sequester tracks 1214, horn disks 1304, switcher pucks 1209, sequester disks 1305, an outer braiding machine track 1203, a plurality of S traveling tow carrier devices and a plurality of Z traveling tow carrier devices.

With regard to FIG. 12, sequester tracks 1214 of the present subject matter may begin with equal curvature to a sequester branch of the outer braiding machine track 1203, and may end with equal curvature to an acquisition branch of the outer braiding machine track 1203. The acquisition and sequester branches of the present subject matter may be tangent to the outer braiding machine track 1203 on one end and tangent to the sequester tracks 1214 on the other end, and may further may be affixed to the outer braiding machine track 1203 of the outer braiding machine ring 1213.

The formation of the allantoidal braided structure comprised of longitudinally varying braid architecture may begin with the overbraiding of section 101 of FIG. 1 with a 5×5 starting point braid architecture 1801, illustrated in FIG. 18. This 5×5 braid architecture 1801 may be formed by the braiding machine, with regard to FIGS. 16 and 17, described herein comprised of 120 tow carrier devices, 1601 and 1602, dispersed along the outer braiding machine ring 1213 and which may be guided by the outer braiding machine track 1203. As the 5×5 braid architecture 1801 may be braided along section 101 of FIG. 1 of the allantoidal preform of the present subject matter, switcher pucks 1209 may be rotated into a braiding position in which the curvature of the outer braiding machine track 1203 may be complete and in which tow carrier devices, 1601 and 1602, may not be transferred out of the outer braiding machine ring 1213 or interact with sequester and acquisition branches of the outer braiding machine track 1203. The rotation of the switcher pucks 1209 into a braiding position may be illustrated in FIG. 17. Subsequently, as tow carrier devices, 1601 and 1602, pass switcher puck 1209 locations there may be no interaction between sequester tracks 1214 and the tow carrier devices, 1601 and 1602. The 5×5 braid architecture 1801 of the braided structure described herein overbraided onto an allantoidal preform is illustrated in FIG. 19.

Figure 16:
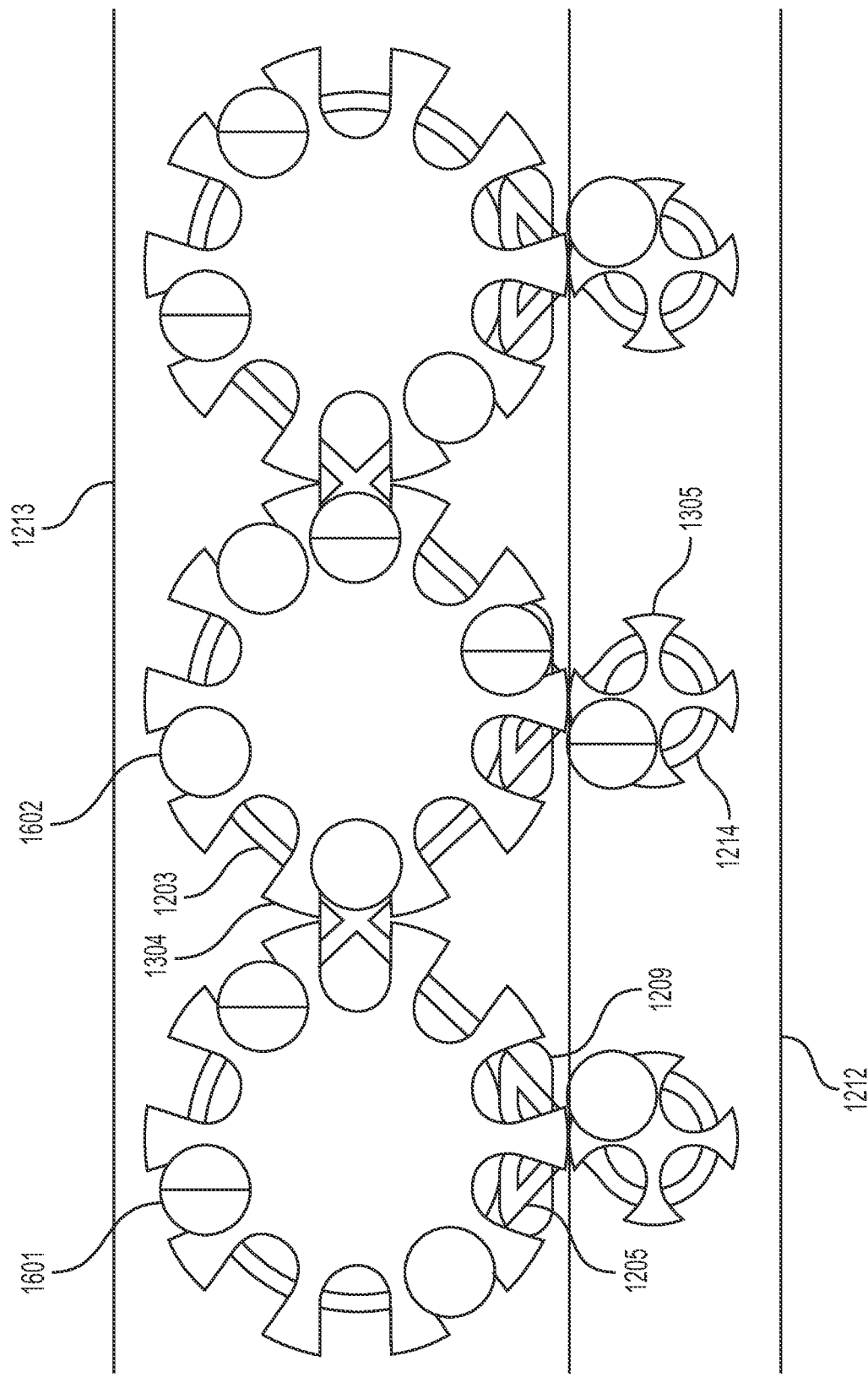
FIG. 16 illustrates a braiding machine for the manufacture of a braided structure with longitudinally varying architecture in which a plurality of tow carrier devices have been sequestered.
Figure 17:
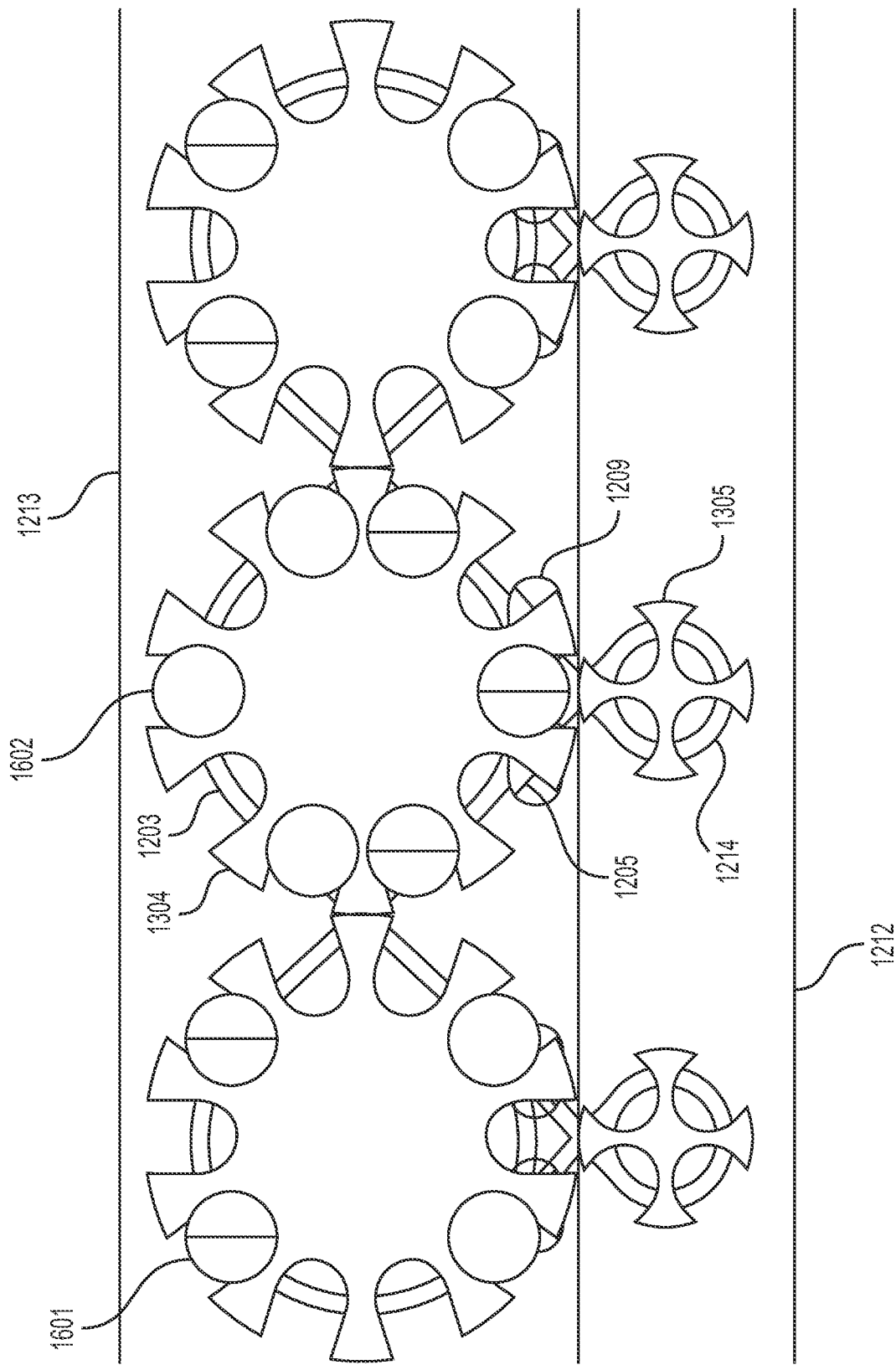
FIG. 17 illustrates a braiding machine for the manufacture of a braided structure with longitudinally varying architecture in which no tow carrier devices have been sequestered.

The switcher pucks 1209 of the present subject matter, illustrated in FIGS. 16 and 17, may be affixed to the outer braiding machine ring 1213 and may be comprised of a plurality of partial braiding machine tracks, or switcher tracks 1205, which may interact with the sequester and acquisition branches of the outer braiding machine track 1203 as well as sequester tracks 1214 of the sequester ring 1212. In embodiments herein each switcher puck 1209 may be comprised of two switcher tracks 1205, a main switcher track and an alternative switcher track. A switcher puck 1209 rotated into a braiding position may complete the curvature of the outer braiding machine track 1203 through the interaction of the main switcher track with the outer braiding machine track 1203. Subsequently, a switcher puck 1209 rotated into a braiding position may not allow for the transfer of tow carrier devices, 1601 and 1602, into or out of the outer braiding machine track 1203.

Additionally, in a continued discussion of FIGS. 16 and 17, a switcher puck 1209 may be rotated into a switch position in which tow carrier devices, 1601, and 1602, may be transferred into or out of the outer braiding machine track 1203. A switcher puck 1209 in a switch position may complete sequestering or acquisition tow carrier device paths comprising acquisition or sequester branches of the outer braiding machine track 1203, alternative switcher tracks and sequester tracks 1214. Therefore, a switcher puck 1209 in the switch position may allow for the transfer of tow carrier devices, 1601 and 1602, into or out of the outer braiding machine track 1203.

Switcher pucks 1209 of embodiments of the present subject matter may be rotated in specific groups in such a manner that S and Z tow carrier devices, 1601 and 1602, may be sequestered or introduced back into and out of the outer braiding machine ring 1203 at different intervals. Therefore, S and Z tow carrier devices, 1601 and 1602, may be transferred into and out of the outer braiding machine track 1203 separately from one another.

The transfer of S and Z tow carrier devices in specific groups may be accomplished through the interaction of gears which may rise and fall, affixed beneath horn disks or sequester disks, to interact with stationary gears affixed beneath horn disks or sequester disks such that half the rise and fall gears may be engaged with half the stationary gears at a time to allow transfer of a plurality of S or Z tow carrier devices between the rings comprising the braiding machine of the present subject matter. Additionally, flippers, clutches or certain other components may be utilized to transfer the tow carrier devices in groups of S or Z tow carrier devices.

Additionally, sequester disks 1305 to accept a plurality of tow carrier devices, 1601 and 1602, may accept only S or Z tow carrier devices, 1601 and 1602, during each sequestration cycle. Further, sequester disks 1305, like the switcher pucks 1209 may be actuated in specific groups such that upon sequestration of S tow carrier devices 1601, half the sequester disks 1305 may rotate for the acceptance of S tow carrier devices 1601 while the remaining half of the sequester disks 1305 may remain stationary.

Once the desired longitudinal length of the 5×5 braided structure of the present subject matter along section 101 of FIG. 1 of the allantoidal preform may be achieved, and the braided structure may be formed along the preform until the transition between 101 and 102 may be reached, illustrated in FIG. 19, the braiding process may be interrupted and ⅕ of the tow carrier devices, 1601 and 1602 illustrated in FIGS. 16 and 17, may be transitioned from the outer braiding machine ring 1213 to the sequester ring 1212 where the tow carrier devices, 1601 and 1602, may be sequestered within the sequester disks 1305.

The removal of tow carrier devices, 1601 and 1602 of FIGS. 16 and 17, may be facilitated by a plurality of switcher pucks 1209 rotated into the switch position, in which a S sequestering tow carrier path may be created to allow the transfer of S tow carrier devices 1601 from the outer braiding machine ring 1213 into the sequester ring 1212. Switcher pucks 1209 rotated in a switch position may be illustrated in FIG. 16.

A tow carrier device, 1601 and 1602, removed from the standard braiding machine track 1203 by a switcher puck 1209 may be sequestered within a sequester track 1214 comprising a sequester ring 1212 and may be held within a sequester track 1214 until it is desired to re-introduce the sequestered tow carrier device, 1601 and 1602, back into the outer braiding machine track 1203. Generally, each time a plurality of tow carrier devices, 1601 and 1602, may be sequestered from the outer braiding machine track 1203 the sequester disks 1305 may rotate to allow for an additional plurality of tow carrier devices, 1601 and 1602, to be removed until the sequester disks 1305 may be filled and a 1×1 braid architecture 1805, of FIG. 18, may be achieved.

After the rotation of a plurality of switcher pucks 1209, illustrated in FIGS. 17 and 17, the braiding process may begin until a plurality of S tow carrier devices 1601 may be transitioned from the outer braiding machine track 1203 into alternative switcher tracks comprising switcher pucks 1209 and into sequester tracks 1214 surrounding each sequester disk 1305. In embodiments herein, after the transfer of the S tow carrier devices 1601 from sequester branches of the outer braiding machine ring 1203 as described, the switcher pucks 1209 may be rotated such that the main switcher track of the switcher pucks 1209 may interact with the outer braiding machine track 1203 and such that the alternative switcher track may no longer complete an S sequestering tow carrier device track. Once a tow carrier device, 1601 and 1602, has entered into a sequester track 1214, each sequester disk 1305 may be rotated into position to accept another tow carrier device, 1601 and 1602. Following the sequester of the plurality of S tow carrier devices 1601, a plurality of Z tow carrier devices 1602 may be sequestered in the same manner; a plurality of switcher pucks 1209 may be rotated into the switch position for the formation of Z sequestering tow carrier device tracks, the plurality of Z tow carrier devices 1602 may be transferred to sequester tracks 1214 and the plurality of switcher pucks 1209 may be rotated into the braiding position. Subsequent to the sequester of the S and Z tow carrier devices, 1601 and 1602, a total of $1/5^{th}$ of the initial 120 tow carrier devices, 1601 and 1602, of embodiments of the braiding machine herein may be sequestered in sequester disks 1305. In an embodiment of the present subject matter, the braiding process may begin again with 96 tow carrier devices, 1601 and 1602, dispersed around the outer braiding machine track 1203 and with 24 tow carrier devices, 1601 and 1602, sequestered in the sequester disks 1305 affixed to the sequester ring 1212. In additional embodiments of the present subject matter, one or more additional S or Z tow carrier devices, 1601 and 1602, may be transferred into sequester disks 1305 before the rotation of the switcher pucks 1209 and the resumption of the braiding process.

Upon the sequester of $1/5$ of the tow carrier devices from the outer braiding machine ring 1213 to the sequester ring 1212, tow materials affixed to spools operatively affixed to sequestered tow carrier devices may be transitioned from bias tows, intertwining for the formation of the braided structure of the present subject matter, to axial tows, which do not interact with the braided structure and which may pay out tow material along the longitudinal axis 1828, illustrated in FIG. 18, of the braided structure along the inner surface of the braided structure.

In a continuing discussion of FIGS. 16 and 17, the sequester disks 1305 of embodiments of the present subject matter may allow for the acceptance of a pre-determined quantity of tow carrier devices, 1601 and 1602, from the outer braiding machine track 1203 into radial slots comprising the sequester disks 1305. This pre-determined quantity may be chosen based on the number of transitions between starting and ending braid point architectures for the formation of the braided structure with longitudinally varying architecture. In non-limiting examples of the present subject matter, the transition from a 6×6 starting point braid architecture to a 1×1 end point braid architecture may require the removal of 5 sets of tow carrier devices to achieve the transition, and therefore the sequester disks 1305 of the embodiment must be able to accept at least 5 tow carrier devices, 1601 and 1602, and therefore must comprise at least 5 radial slots.

Within a braiding machine, comprised of 120 tow carrier devices, for the formation of a 5×5 braid architecture, two S tow carrier devices 1601 may be dispersed on one S edge and three S tow carrier devices 1601 on the adjacent edge in a repeating pattern. Similarly, there may be three Z tow carrier devices 1602 on the opposing Z edge and two Z tow carrier devices 1602 on the adjacent Z edge in a repeating pattern.

Upon the removal of $1/5$ of the tow carrier devices as described herein, to transition from section 101 to section 102 of FIG. 1 of the allantoidal preform of embodiments herein, a 4×4 braid architecture 1802, illustrated in FIG. 18, may be achieved in which there may be two S tow carrier devices 1601, dispersed around the outer braiding machine track 1203 of FIGS. 16 and 17, remaining on one S edge and two S tow carrier devices 1601 remaining on an adjacent edge in a repeating pattern while there may be two Z tow carrier devices 1602 remaining on the opposing Z edge and two Z tow carrier devices 1602 remaining on the adjacent Z edge in a repeating pattern.

Upon the removal of $1/5^{th}$ of the tow carrier devices from the outer braiding machine track 1203, 96 tow carrier devices, 1601 and 1602, of the initial 120 tow carrier devices, 1601 and 1602, may remain dispersed along the outer braiding machine track 1203. After the plurality of switcher pucks 1209 have been rotated into the braiding position such that the outer braiding machine track 1203 is completed by the main switcher track of the switcher pucks 1209, the braiding process may begin for the formation of a 4×4 braid architecture 1802, of FIG. 18.

At a predetermined longitudinal length along section 102, illustrated in FIG. 20, the braiding process may be halted and $1/4^{th}$ of the remaining tow carrier devices, 1601 and 1602 of FIGS. 16 and 17, may be removed, altering the repeating pattern of S and Z tow carrier devices, 1601 and 1602, to one S tow carrier device 1601 on one S edge and two S tow carrier devices 1601 on the adjacent S edge, two Z tow carrier devices 1602 on the opposing Z edge and one Z tow carrier device 1602 on the adjacent Z edge. The removal of $1/4^{th}$ of the remaining tow carrier devices may occur in the same manner as the removal of $1/5^{th}$ of the original 120 tow carrier devices, 1601 and 1602.

Consequently, at the point which it is desired to remove $1/4^{th}$ of the 96 remaining tow carrier devices, 1601 and 1602, from the outer braiding machine track 1203, a plurality of switcher pucks 1209 may be rotated into the switch position such that the alternative switcher track of the switcher pucks 1209 may form a S sequestering tow carrier device track through which S tow carrier devices 1601 may travel and to allow for S tow carrier devices 1601 to be removed from the outer braiding machine track 1203 and into the sequester tracks 1214. After a plurality of S tow carrier devices 1601 may be transferred into sequester tracks 1214, the sequester disks 1305 may be rotated to accept a plurality of additional tow carrier devices, 1601 and 1602. Accordingly, the switcher pucks 1209 may be rotated into the braiding position such that the main switcher track of the switcher pucks 1209 may complete the outer braiding machine track 1203 and tow carrier devices, 1601 and 1602, may no longer be transferred from the outer braiding machine track 1203 to sequester tracks 1214. This same process may be repeated for the sequestration of a plurality of Z tow carrier devices 1602. As a result of the sequestration of S and Z tow carrier devices, 1601 and 1602, $1/4^{th}$ of the remaining tow carrier devices, 1601 and 1602, may be removed from the outer braiding machine ring 1213. Subsequently, braiding may begin with 72 remaining tow carrier devices, 1601 and 1602, dispersed around the outer braiding machine track 1203 and with 48 tow carrier devices, 1601 and 1602, sequestered in the sequester tracks 1214 surrounding the sequester disks 1305 within the sequester ring 1212 resulting in a 3×3 braid architecture 1803.

Upon the sequester of ¼ of the tow carrier devices from the outer braiding machine ring 1213 to the sequester ring 1212, tow materials affixed to spools operatively affixed to sequestered tow carrier devices may be transitioned from bias tows, intertwining for the formation of the braided structure of the present subject matter, to axial tows, which do not interact with the braided structure and which may pay out tow material along the longitudinal axis of the braided structure along the inner surface of the braided structure.

Successively, at an additional point defined by the longitudinal length of the braided product comprised of a 3×3 braid architecture 1803 illustrated in FIG. 21, the braiding process may again be halted and a plurality of switcher pucks 1209, of FIGS. 16 and 17, may be rotated into the switch position to result in the creation of an S sequestering tow carrier path and to allow the removal of a plurality of the remaining S tow carrier devices 1601 from the outer braiding machine track 1203. A plurality of S tow carrier devices 1601 may then be transitioned from the outer braiding machine track 1203 to sequester tracks 1214 as described herein. The sequester disks 1305 may then be rotated, in embodiments of the present subject matter to accept a plurality of additional tow carrier devices, 1601 and 1602. Additionally, the plurality of switcher pucks 1209 may be rotated such that the outer braiding machine track 1203 may be completed by the main switcher track of the switcher pucks 1209. The process may then be repeated for a plurality of Z tow carrier devices 1602. Subsequent to the removal of $\frac{1}{3}^{rd}$ of the remaining tow carrier devices, 1601 and 1602, from the outer braiding machine track 1203, 48 tow carrier devices, 1601 and 1602, may remain dispersed along the outer braiding machine track 1203 while 72 tow carrier devices, 1601 and 1602, may be sequestered in sequester tracks 1214 affixed to the sequester ring 1212. This arrangement of tow carrier devices, 1601 and 1602, of embodiments herein may result in the formation of a 2×2 braid architecture 1804, illustrated in FIG. 18.

In a continuing discussion of FIGS. 16 and 17, The removal of $\frac{1}{3}^{rd}$ of the remaining tow carrier devices, 1601 and 1602, may alter the pattern of S and Z tow carrier devices, 1601 and 1602, in the outer braiding machine track 1203 to one S tow carrier device 1601 on one S edge and one S tow carrier device 1601 on the adjacent S edge, one Z tow carrier device 1602 on the opposing Z edge and one Z tow carrier device 1602 on the adjacent Z edge. Further, the sequester of $\frac{1}{3}^{rd}$ of the remaining tow carrier devices from the outer braiding machine ring 1213 to the sequester ring 1212 may result in the conversion of tow materials affixed to sequestered tow carrier devices from bias tows to axial tows, which may pay out material along the longitudinal axis of the braided structure.

Consequently, after the desired longitudinal length of the braided structure with a 2×2 braid architecture 1804 may be braided, illustrated in FIG. 22, and the transition between section 102 and 103 of FIG. 1 may be reached ½ of the remaining tow carrier devices, 1601 and 1602 of FIGS. 16 and 17, may be removed from the outer braiding machine track 1203.

At the transition between section 102 and 103 of the allantoidal preform of embodiments herein, illustrated in FIG. 1, ½ of the remaining tow carrier devices, 1601 and 1602 of FIGS. 16 and 17, may be transitioned from the outer braiding machine track 1203 and into sequester tracks 1214 surrounding each of the sequester disks 1305. The tow carrier devices, 1601 and 1602, may be removed in the same manner as described in previous steps of the braiding process herein. Upon the removal of ½ of the remaining tow carrier devices, 1601 and 1602, from the outer braiding machine track 1203, 24 tow carrier devices, 1601 and 1602, may remain dispersed along the outer braiding machine track 1203 while 96 tow carrier devices, 1601 and 1602, may remain sequestered within the sequester ring 1212.

The removal of ½ of the remaining tow carrier devices, 1601 and 1602, may alter the pattern of S and Z tow carrier devices, 1601 and 1602, in the outer braiding machine track 1203 to one S tow carrier device 1601 on one S edge and no S tow carrier devices 1601 on the adjacent S edge, no Z tow carrier devices 1602 on the opposing Z edge and one Z tow carrier device 1602 on the adjacent Z edge. Additionally, the sequester of ½ of the remaining tow carrier devices may result in the transference of tow materials affixed to the sequestered tow carrier devices from bias tows to axial tows.

After the removal of ½ of the remaining tow carrier devices, in embodiments herein, the sequester ring 1212 comprising the sequester disks 1305 and the sequestered tow carrier devices, 1601 and 1602, may be rotated as described in embodiments of the present subject matter. As previously discussed in an embodiment herein, this rotation may allow for flexibility within the braided structure. The omission of rotation in this step or any other step of embodiments herein may result in the formation of a ridged braided structure. In embodiments of the present subject matter, rotation of the sequester ring 1212 may occur at any point during the braiding process including upon the sequester of tow carrier devices, 1601 and 1602, from the outer braiding machine track 1203, between any transition in braid architecture or any other interval during the braiding process.

Further, the degree to which the sequester ring may be rotated may determine the degree of flexibility within the braided structure of the present subject matter. In a non-limiting example, if the sequester ring were to be rotated a single sequester disk position, very little flexibility may be created within the braided structure, however, if the sequester ring were to be rotated one full revolution, much more flexibility may be allowed within the braided structure.

Subsequent to the braiding of the desired longitudinal length of braided structure of a 1×1 braid architecture 1805, illustrated in FIG. 18, along section 103 of FIG. 1, and when the transition between section 103 and 102 of the allantoidal preform may reached, the braid architecture of the braided structure may again be altered to increase the braid architecture from a 1×1 starting point braid architecture 1805 to a 2×2 braid architecture 1804 to conform to the variable cross-sectional geometry of section 102 and to begin the transition from the 1×1 starting point braid architecture 1805 to a 5×5 end point braid architecture 1801.

The transition in braid architecture between a 1×1 braid architecture 1805, of FIG. 18, and a 2×2 braid architecture 1804 may occur in a similar manner to the removal of the tow carrier devices, 1601 and 1602 of FIGS. 16 and 17, as described herein. To transition the braid architecture of the braided structure of embodiments herein from a 1×1 braid architecture 1805 to a 2×2 braid architecture 1804, the braiding process may be halted and a plurality of sequester disks 1305 may be rotated to transfer a plurality of S tow carrier devices 1601 from sequester disks 1305 to horn disks 1304. After the transfer of the plurality of S tow carrier devices 1601 from sequester disks 1305 to horn disks 1304, the S tow carrier devices 1601 may still be comprised within sequester tracks 1214. A plurality of switcher pucks 1209 may then be rotated into the switch position in which the outer braiding machine track 1203 may be disrupted and the alternative switcher tracks of the switcher pucks 1209, the acquisition branches of the outer braiding machine ring 1213, and the sequester tracks 1214 may form S acquisition tow carrier device tracks. After the transfer of S tow carrier devices 1601 back into the outer braiding machine track 1203, the sequester disks 1305 may be rotated such that a plurality of tow carrier devices, 1601 and 1602 may be in position to re-enter the outer braiding machine track 1203. The plurality of switcher pucks 1209 may then be rotated into the braiding position in which the outer braiding machine track 1203 may be completed by the main switcher track of the switcher pucks 1209. The process may be repeated for a plurality of Z tow carrier devices 1602; a plurality of Z tow carrier devices 1602 maybe transferred from sequester disks 1305 to horn disks 1304, a plurality of switcher pucks 1209 may rotate into the switch position to form Z acquisition tow carrier device tracks, the plurality of Z tow carrier devices 1602 may be transferred into the outer braiding machine track 1203 and the plurality of switcher pucks 1209 may be rotated into the braiding position. The introduction of tow carrier devices, 1601 and 1602, into the outer braiding machine track 1203 may result in 48 tow carrier devices, 1601 and 1602, dispersed around the outer braiding machine track 1203 and 72 tow carrier devices, 1601 and 1602, sequestered within the sequester ring 1212. In other embodiments of the present subject matter, a plurality of additional tow carrier devices, 1601 and 1602, may be introduced back into the outer braiding machine track 1203 during the sequestration cycle. In additional embodiments of the present subject matter, before the introduction of $\frac{1}{4}^{th}$ of the tow carrier devices, 1601 and 1602, from the sequester ring 1212 into the outer braiding machine track 1203, the sequester ring 1212 comprising the sequester disks 1305 and the sequestered tow carrier devices, 1601 and 1602, may again be rotated to allow for increased flexibility within the braided structure with longitudinally varying architecture.

Upon the transition in braid architecture from a 1×1 to a 2×2 braid architecture and the addition of $\frac{1}{4}^{th}$ of the remaining sequestered tow carrier devices, 1601 and 1602 of FIGS. 16 and 17, into the outer braiding machine track 1203, the pattern of S and Z tow carrier devices, 1601 and 1602 may be altered to one S tow carrier device 1601 on one S edge and one S tow carrier device 1601 on the adjacent S edge, one Z tow carrier device 1602 on the opposing Z edge and one Z tow carrier device 1602 on the adjacent Z edge.

After the desired longitudinal length of the braided structure of 2×2 braid architecture 1804 may be achieved, the braid architecture may continue to be increased from a 2×2 braid architecture 1804, to a 3×3 braid architecture 1803, illustrated in FIG. 18 through the same method as described herein; through the addition of $\frac{1}{3}^{rd}$ of the tow carrier devices, 1601 and 1602 illustrated in FIGS. 16 and 17, sequestered within the sequester ring 1212 into the outer braiding machine track 1203. The addition of $\frac{1}{3}^{rd}$ of the sequestered tow carrier devices, 1601 and 1602, may result in 72 tow carrier devices dispersed around the outer braiding machine track 1203 and 48 tow carrier devices, 1601 and 1602, sequestered within the sequester ring 1212. Additionally, upon the transition in braid architecture from a 2×2 1804 to a 3×3 braid architecture 1803 and the addition of $\frac{1}{3}^{rd}$ of the remaining sequestered tow carrier devices, 1601 and 1602, into the outer braiding machine track 1203, the pattern of S and Z tow carrier devices, 1601 and 1602 may be altered to one S tow carrier device 1601 on one S edge and two S tow carrier devices 1601 on the adjacent S edge, two Z tow carrier devices 1602 on the opposing Z edge and one Z tow carrier device 1602 on the adjacent Z edge.

In a continuing discussion of FIGS. 16, 17 and 18, subsequent to the braiding of the desired longitudinal length of the braided structure of 3×3 braid architecture 1803 of the present subject matter, the braid architecture of the present subject matter may again be altered from a 3×3 braid architecture 1803 to a 4×4 braid architecture 1802 through the addition of ½ of the remaining sequestered tow carrier devices, 1601 and 1602, from the sequester ring 1212 to the outer braiding machine track 1203. This may result in 96 tow carrier devices, 1601 and 1602, dispersed around the outer braiding machine track 1203 and 24 tow carrier devices sequestered within the sequester ring 1212. Further, upon the addition of ½ of the remaining sequestered tow carrier devices, 1601 and 1602, into the outer braiding machine track 1203, the pattern of S and Z tow carrier devices, 1601 and 1602, may be altered to two S tow carrier devices 1601 on one S edge and two S tow carrier devices 1601 on the adjacent S edge, two Z tow carrier devices 1602 on the opposing Z edge and two Z tow carrier devices 1602 on the adjacent Z edge.

Consequently, after the desired longitudinal length of 4×4 braid architecture 1802 along section 102, of FIG. 1, of the allantoidal preform may be braided, and the transition from section 102 to 101 may be reached, the braid architecture may again be altered from a 4×4 braid architecture 1802 to a 5×5 braid architecture 1801. This transition in braid architecture may be achieved through the transfer of all remaining tow carrier devices, 1601 and 1602, from the sequester ring 1212 into the outer braiding machine track 1203. This transfer of tow carrier devices, 1601 and 1602, may result in 120 tow carrier devices, 1601 and 1602, dispersed around the outer braiding machine track 1203 and no remaining tow carrier devices, 1601 and 1602, present in the sequester ring 1212. Further, upon the addition of the remaining sequestered tow carrier devices, 1601 and 1602, into the outer braiding machine track 1203, the pattern of S and Z tow carrier devices, 1601 and 1602, may be altered to two S tow carrier devices 1601 on one S edge and three S tow carrier devices 1601 on the adjacent S edge, three Z tow carrier devices 1602 on the opposing Z edge and two Z tow carrier devices 1602 on the adjacent Z edge.

Throughout each transition in braid architecture from the 1×1 starting point braid architecture 1805 to the 5×5 end point braid architecture 1801, as described herein, each introduction of tow carrier devices from the sequester ring 1212 to the outer braiding machine ring 1213 may result in the conversion of axial tows to bias tows. Further, upon the transition from the 4×4 braid architecture to the 5×5 end point braid architecture all tow materials comprising the braiding machine may be bias tows interacting to form the braided structure of the present subject matter.

The method for the overbraiding of allantoidal preforms of embodiments herein may be continued until the desired length of the braided structure of the present subject matter may be achieved.

An embodiment of the present subject matter may have particular utility for the manufacture of braided structures to be deployed in dry or resin impregnated form in composite parts comprised of a repeating series of generally allantoidal preforms comprised of generally annular cross sections with each adjacent pair of allantoidal shaped preforms connected by relatively narrower annular cross sections or conduits as shown in FIG. 1.

While the braided structure with longitudinally varying architecture has been discussed in embodiments herein as overbraided over allantoidal preforms of complex geometry, in additional embodiments of the present subject matter, the braided structure with longitudinally varying architecture may be overbraided onto a plurality of preforms with complex geometry of non-allantoidal shape or configuration.

Additional embodiments of the braided structure with longitudinally varying architecture may be comprised of different start point and end point braid architectures. In a non-limiting example, an additional embodiment may be comprised of alternating 4×4 and 2×2 regions with corresponding transition architectures between each start and end point architecture. Further alternate embodiments may be comprised of varying patterns of start and end point architectures and the corresponding transitions. For example, one alternate braid structure may be comprised of a 5×5 region transitioned to a 3×3 region transitioned to a 5×5 region to a 1×1 region and so on in any pattern required by the final deployment of the braid structure.

An alternate embodiment of the present subject matter may include tow carrier devices comprised of a plurality of tow materials such that a material gradient may be obtained along the braided structure of longitudinally varying architecture as well as a gradient in braid architecture of the braided structure described herein.

Further, in additional embodiments of the present subject matter each sequestered group of tow carrier devices may be comprised of a plurality of tow materials such that the removal of one set of tow carrier devices may sequester a particular material from the braided structure until it is desired to reintroduce the material at another predetermined interval.

An additional embodiment of the present subject matter may be comprised of a braided structure with longitudinally varying architecture which may incorporate a combination of a plurality of tow materials in which the ratio of the plurality of tow materials may be dictated by the sequester of specific sets of tow carrier devices at specific intervals during the manufacturing process.

In a non-limiting example of the present subject matter, a braiding machine comprised of 120 tow carrier devices may be comprised of 5 sets of 24 tow carrier devices comprised of different tow materials. Initially during the braiding process, all tow carrier devices may be intermixed resulting in a braided structure comprised of five different tow materials and comprised of a 5×5 braid architecture. At a predetermined interval, ⅕th of the tow carrier devices may be sequestered. This plurality of tow carrier devices or, one of 5 sets of 24 tow carrier devices, may be removed from the outer braiding machine ring and transferred into the sequester ring. This one set of 24 tow carrier devices may comprise all the tow carrier devices of a specific tow material.

Subsequently, the manufacturing process may begin again for the formation of a braided structure comprised of 4 different sets of tow carrier devices comprised of four different tow materials. At an additional predetermined interval in the braiding process, ¼th of the remaining tow carrier devices may be sequestered in such a way that the 1 set of 24 tow carrier devices may comprise all of the same tow material. Upon production of the braided structure, the braided structure may be composed of 3 sets of 24 different tow materials.

Consequently, the process may then continue until one specific set of tow materials may remain.

In an additional embodiment of the present subject matter, upon the sequester of tow carrier devices comprising a specific tow material, an additional set of tow carrier devices comprising a specific tow material sequestered within the sequester disks may be introduced back into the outer braiding machine track. In this manner, the braid architecture of the braided structure may be maintained but the material of which the braided structure may be comprised may be altered. This process may be continued with the removal and addition of specific tow materials at intervals in which tow carrier devices may be sequestered. Further, at chosen intervals the braid architecture may be altered and no exchange of tow carrier devices may take place.

An additional embodiment of the braiding machine of the present subject matter may be comprised of 120 tow carrier devices. At the beginning of the manufacturing process 96 tow carrier devices of the same or differing tow materials may be sequestered within the sequester ring while 24 tow carrier devices may be dispersed around the outer braiding machine ring. The 24 tow carrier devices within the outer braiding machine ring may be exchanged with ¼ of the tow carrier devices in the sequester ring at different intervals to form a continuous 1×1 braided structure with varying sections of tow materials. This method may also be used to create a 1×1 braided structure of the same tow material and may be used to prolong the intervals in which re-doffing of the braiding machine may occur. This method may also be used to form other braided structures with differing architectures including 2×2, 3×3, 4×4, 5×5 and other braid architectures.

An additional embodiment of the present subject matter may allow for the creation of a braided structure comprised of a constant ratio of specific tow materials. In a non-limiting example, an embodiment of a braiding machine may be comprised of 120 tow carrier devices comprised of 4 sets of different tow materials. Of the 120 tow carrier devices, four sets of 30 tow carrier devices may contain different tow materials. Upon the sequester of 24 tow carrier devices to transition from a 5×5 braid architecture to a 4×4 braid architecture the tow carrier devices may be sequestered in such a way that 6 of each of the tow carrier devices of the four different tow materials may be removed. The tow carrier devices may be sequestered in such a fashion that each sequester of tow carrier devices may maintain the same ratio of tow carrier devices with different tow materials such that when the 1×1 braid architecture may be achieved and 24 tow carrier devices remain un-sequestered, 4 sets of 6 tow carrier devices comprising different tow materials remain.

Additional embodiments of the present subject matter may comprise braiding machines of greater pluralities of tow carrier devices to allow for additional variations of annular cross-sectional sized braided structures to be manufactured and a variety of different braid architectures to be achieved. For example, a braiding machine comprised of 144 tow carrier devices may be employed to result in the transition of braid architecture from a 6×6 braid architecture to a 1×1 braid architecture. In opposition, an additional embodiment may be comprised of fewer tow carrier devices to achieve similar braid architectures with smaller annular cross-sectional diameters.

An additional embodiment of the present subject matter may comprise a braided structure with longitudinally varying architecture of the present subject matter in which the braid architecture of the braided structure may be varied in such a manner to create sections of variable compaction within the braided structure to allow for flexibility of movement of the braided structure in some areas while other areas of the braided structure may be rigid. Additionally, the braid architecture may be varied in such a manner to create areas of high and low tow density across a preform of complex geometry. In a non-limiting example of the present subject matter, a braided structure may be comprised of a plurality of braid architectures in specific locations along the longitudinal length of the preform including a 10×10 braid architecture of embodiments herein as well as a 1×1 braid architecture. Sections of the braided structure comprising 10×10 braid architecture may allow for locations of high tow density as well as expansion and contraction of the braided structure. Additionally, sections of 1×1 braid architecture may comprise locations of low tow density and may not allow for expansion and contraction of the braided structure.

While embodiments of the braided structure with longitudinally varying braid architecture have been discussed herein as comprised of biaxial braided structures, embodiments of the present subject matter may comprise triaxial braided structures in which there may be three sets of intertwining tows for the formation of the braided structure of the present subject matter; two sets of tows oriented in the bias direction and one set of tows oriented along the longitudinal axis of the braided product. Embodiments of the braided product described herein comprised of triaxial braided structures may result in the formation of braided structures in which the allantoidal form of the braided structure may be locked in place such that the braided structure may maintain an allantoidal form when removed from the preform of complex geometry as discussed herein.

An additional embodiment of the present subject matter may comprise a braided sleeve comprising a plurality of tows, wherein the braid comprises a longitudinal axis and a first portion, a second portion and a third portion along the longitudinal axis. The first portion may comprise one or more of the plurality of tows intertwined with one or more of the other tows of the plurality of tows. The second portion of the braid may comprise one of the plurality of tows removed from being intertwined with a remaining plurality of tows such that the removed tow may be located in one of an interior or exterior of the braided sleeve. Additionally, the third portion of the braid may comprise the removed tow intertwined back with the remaining plurality of tows. Further, the third portion of the braided sleeve may comprise the reintroduction of the removed tow into the braid to be intertwined with the remaining plurality of tows forming the braided sleeve structure.

The braided sleeve may also comprise the second portion wherein the second portion comprises a fourth and fifth portion in sequence prior to the third portion along the longitudinal axis of the braided structure. The fourth portion may comprise an additional one of the plurality of tows and the additional removed tow, located in the exterior or the interior of the braided sleeve. The fifth portion may comprise the additional removed tow intertwined with the remaining plurality of tows.

Further, the second portion may comprise two of the plurality of tows removed from being intertwined with the remaining plurality of tows such that the two tows may be located on the interior or the exterior of the braided sleeve. Additionally, the third portion may comprise one of the two of the plurality of tows being intertwined with the remaining plurality of tows and the other of the two of the plurality of tows being intertwined on the interior or the exterior of the braided sleeve.

The braided sleeve of additional embodiments of the present subject matter may further comprise the braided sleeve comprising a substantially circular cross-section transverse to the longitudinal axis wherein the removed tow may be removed from the remaining plurality of tows at a removal point on the substantially circular cross-section and may be intertwined with the remaining plurality of at a reintroduction point on the substantially circular cross-section of the braided sleeve. The removed tow may be spirally wrapped on the interior or the exterior of the braided sleeve in the second portion as described herein wherein the reintroduction point is at an angular displacement from the removal point around the substantially circular cross section. Additionally, the removed tow may be spirally wrapped such that the reintroduction point is at the same angle on the substantially circular cross section as the removal point and the reintroduction point is at a longitudinal displacement from the removal point.

The braided sleeve may further comprise the first portion of the braid comprising the plurality of tows arranged in substantially a plurality of bias directions with respect to the longitudinal axis wherein the plurality of bias directions includes a first and a second bias direction, the second portion comprising the remaining plurality of tows intertwined in the first bias direction and the second bias direction and wherein the third portion may comprise the removed tow intertwined with the remaining plurality of tows in the first bias direction and the second bias direction.

Additionally, the braided sleeve of embodiments herein may further comprise the first portion of the braid comprising the plurality of tows intertwined with one or more tows of the other plurality of tows arranged in substantially a plurality of bias directions with respect to the longitudinal axis wherein the plurality of bias directions have a plurality of angles with respect to the longitudinal axis and wherein the plurality of bias directions include a first bias direction at a positive angle, a second bias direction at a negative angle, a third bias direction at a positive angle and a fourth bias direction at a negative angle. The first bias direction may be different from the third bias direction and the second bias direction may be different from the fourth bias direction such that the plurality of tows may be intertwined in the first and second bias direction. Further, at least one of the second portion may comprise the remaining plurality of tows intertwined in the third bias direction and the fourth bias direction or the third portion comprising the removed tow intertwined with the remaining plurality of tows intertwined in the third bias direction and the fourth bias direction.

The braided sleeve may additionally comprise the second portion further comprising the removed tow being spirally wrapped in a fifth bias direction at a positive or negative angle with respect to the longitudinal axis wherein the fifth bias direction may be different than the first and second bias direction.

In an additional embodiment of the present subject matter, the braided sleeve may comprise a substantially circular cross-section transverse to the longitudinal axis wherein the second portion may further comprise an additional one of the plurality of tows removed from being intertwined with the remaining plurality of tows wherein the plurality of removed tows includes a first removed tow and a second removed tow and the first removed tow may be spirally wrapped on the exterior or the interior of the braid in a first bias direction and the second removed tow may be spirally wrapped on the exterior or the interior of the braid in a second bias direction wherein the first bias direction may be different from the second bias direction.

In an additional embodiment of the present subject matter, the braided sleeve of embodiments herein may comprise a braid comprising a longitudinal axis and a plurality of tows wherein the plurality of tows may be contiguous along the longitudinal axis such that at least some of the plurality of tows may be intertwined with one or more other tows of the plurality of tows and one of the plurality of tows may be removed from being intertwined with a remaining plurality of tows along a portion of the longitudinal axis and that the removed tow may be intertwined with the remaining plurality of tows along another portion of the longitudinal axis.

A further embodiment of the braided structure with longitudinally varying braid architecture comprises a braid reinforcement for a multi-tank and flexible connector structure comprising a braided sleeve including a plurality of tows wherein the braided sleeve comprises a longitudinal axis and such that the braided sleeve is configured to form a plurality of cylindrical tanks and a cylindrical connector along the longitudinal axis. Each of the tanks may comprise a first diameter and each connector may comprise a second diameter such that the plurality of tanks including a first tank and a second tank such that the cylindrical connector may be located in between the first and second tank. Additionally, the first tank may comprise at least some of the plurality of tows intertwined with one or more other tows of the plurality of tows and the connector may comprise one of the plurality of tows removed from being intertwined with a remaining plurality of tows and the removed tow being located on the exterior or the interior of the braided sleeve wherein the second diameter may be smaller than the first diameter and the second tank may comprise the removed tow being intertwined with the remaining plurality of tows. The braid reinforcement of the present subject matter may comprise a ratio of the first diameter to the second diameter of approximately 3 to 1, 4 to 1, 5 to 1, 6 to 1, 7 to 1, 8 to 1, 9 to 1 or 10 to 1.

The braid reinforcement of embodiments herein may comprise a first transitional portion and a second transitional portion along the longitudinal axis wherein the first transitional portion may be located in between the first tank and the connection and the second transitional portion may be located in between the connector and the second tank. The connector may further comprise at least an additional one of the plurality of tows removed from being intertwined with the remaining plurality of tows and may be located in the exterior of the interior of the braided sleeve. Additionally, each of the first transitional portions and the second transitional portions may comprise the additional one of the plurality of tows which may be intertwined with the remaining plurality of tows.

The braid reinforcement may further comprise the connector of embodiments herein comprising a radius of curvature wherein the first tank may have a first longitudinal axis and the second tank may have a second longitudinal axis and the connector may be configured to be repositioned within a range of a radius of curvature so that the first tank and the second tank maybe adaptable to be repositioned wherein at least one of the first tank longitudinal axis or the second tank longitudinal axis may be oriented at a plurality of bias directions with respect to the longitudinal axis.

Further additional embodiments of the present subject matter may comprise a set of vessels adapted to endure pressure comprising the braid reinforcement of embodiments herein and may additionally comprise a flexible gas pressure tube within the braided sleeve.

An embodiment of the method for the production of the braided sleeve may comprise the steps of firstly, forming a braid comprising a plurality of tows, a longitudinal axis and a first portion, a second portion and a third portion along the longitudinal axis. Secondly along the first portion, intertwining the plurality of tows with one or more other tows of the plurality of tows. Thirdly, along the second portion, removing one of the plurality of tows from being intertwined with a remaining plurality of tows and relocating the removed tow to the interior or the exterior of the braided sleeve and fourthly, along the third portion, intertwining the removed tow with the remaining plurality of tows.

The method for the production of the braided sleeve of embodiment of the braided structure with longitudinally varying architecture of embodiments herein may additionally include the steps of along the second portion, forming a forth portion and a fifth portion in sequence prior to the third portion along the longitudinal axis, along the forth portion intertwining an additional one of the plurality of tows removed from being intertwined with the remaining plurality of tows and relocating the additional removed tow to the interior or the exterior of the braided sleeve and along the fifth portion, intertwining the additional removed tow with the remaining plurality of tows. Additionally, the method may comprise the steps of along the second portion, removing two of the plurality of tows from being intertwined with the remaining plurality of tows and relocating the removed two of the plurality of tows to the interior or the exterior of the braided sleeve, and along the third portion intertwining the one of the two of the plurality of tows with the remaining plurality of tows and relocating the other of the two of the plurality of tows on the interior or the exterior of the braided sleeve. Further, the method may comprise the step of along the second portion, wrapping the removed tow in a spiral around at least one of the interior or the exterior of the braided sleeve.

While the above subject matter has been illustrated and described in detail in the drawings and foregoing discussion, the same is to be considered as illustrative and not restrictive in character, it being understood that example embodiments have been shown and described and that all changes and modifications that come within the scope and spirit of the invention are embraced by the disclosure.

The invention claimed is:

1. A braided sleeve comprising:
   a braid having a longitudinal axis and including a plurality of tows;
   the plurality of tows being contiguous along the longitudinal axis;
   at least some of the plurality of tows being intertwined with one or more other tows of the plurality of tows;
   a set of the plurality of tows being removed from being intertwined with a remaining plurality of tows along a first portion of the longitudinal axis; and
   each tow of the set of tows further being intertwined with at least one of the other tows of the set of tows along a second portion of the longitudinal axis.

2. The braided sleeve of claim 1, wherein the braided sleeve has a substantially circular cross section transverse to the longitudinal axis.

3. The braided sleeve of claim 2, wherein the set of the plurality of tows removed from being intertwined is removed at a removal point on the substantially circular cross section.

4. The braided sleeve of claim 3, wherein the set of the plurality of tows removed from being intertwined is intertwined at a reintroduction point on the substantially circular cross section.

5. The braided sleeve of claim 4, wherein the reintroduction point is at an angular displacement from the removal point.

6. The braided sleeve of claim 5, wherein the reintroduction point is at a longitudinal displacement from the removal point.

7. The braided sleeve of claim 4, wherein a first removed tow of the plurality of tows removed from being intertwined is spirally wrapped in one of an interior or an exterior of the braid in a first bias direction.

8. The braided sleeve of claim 7, wherein a second removed tow of the plurality of tows removed from being intertwined is spirally wrapped in one of the interior or the exterior of the braid in a second bias direction, different from the first bias direction.

9. A braided sleeve comprising:
a braid including a plurality of tows, the braid having a longitudinal axis and forming a first portion, a second portion and a third portion of the braid along the longitudinal axis;
the first portion comprising the plurality of tows intertwined with each other;
the second portion comprising at least one of the plurality of tows removed from being intertwined with a remaining plurality of tows at least along a length of the second portion and being located in one of an interior or an exterior of the braided sleeve; and
the third portion comprising the removed tow intertwined with the remaining plurality of tows.

10. The braided sleeve of claim 9, further comprising:
the second portion further comprising a fourth portion and a fifth portion in sequence prior to the third portion along the longitudinal axis;
the fourth portion comprising an additional one of the plurality of tows removed from being intertwined with the remaining plurality of tows and the additional removed tow being located in one of the interior or the exterior of the braided sleeve; and
the fifth portion comprising the additional removed tow intertwined with the remaining plurality of tows.

11. The braided sleeve of claim 9, further comprising:
the second portion further comprising two of the plurality of tows removed from being intertwined with the remaining plurality of tows and the two of plurality of tows being located in one of the interior or the exterior of the braided sleeve; and
the third portion further comprising one of the two of the plurality of tows being intertwined with the remaining plurality of tows and the other of the two of the plurality of tows being located in one of the interior or the exterior of the braided sleeve.

12. The braided sleeve of claim 9, further comprising:
the first portion further comprising the plurality of tows intertwined with one or more other tows of the plurality of tows in substantially a plurality of bias directions with respect to the longitudinal axis and the plurality of bias directions having a plurality of angles with respect to the longitudinal axis, the plurality of bias directions including a first bias direction at a positive angle, a second bias direction at a negative angle, a third bias direction at a positive angle and a fourth bias direction at a negative angle, the first bias direction being different than the third bias direction and the second bias direction being different than the fourth bias direction, and the plurality of tows intertwined in the first bias direction and the second bias direction; and
at least one of the second portion further comprising the remaining plurality of tows intertwined in the third bias direction and the fourth bias direction or the third portion further comprising the removed tow intertwined with the remaining plurality of tows intertwined in the third bias direction and the fourth bias direction.

13. The braided sleeve of claim 9, wherein the removed tow is reintroduced to be intertwined with the remaining plurality of tows in the third portion.

14. The braided sleeve of claim 13, further comprising:
the braided sleeve having a substantially circular cross-section transverse to the longitudinal axis;
the removed tow being removed from the remaining plurality of tows at a removal point on the substantially circular cross section;
the removed tow being intertwined with the remaining plurality of tows at a reintroduction point on the substantially circular cross section; and
the removed tow spirally wrapped in one of the interior or the exterior of the braided sleeve in the second portion wherein the reintroduction point is at an angular displacement from the removal point around the substantially circular cross section.

15. The braided sleeve of claim 14, further comprising the removed tow being spirally wrapped so that the reintroduction point is at the same angle on the substantially circular cross-section as the removal point and the reintroduction point is at a longitudinal displacement from the removal point.

16. The braided sleeve of claim 13, further comprising:
the braided sleeve having a substantially circular cross-section transverse to the longitudinal axis;
the second portion further comprising an additional one of the plurality of tows removed from being intertwined with the remaining plurality of tows, the plurality of removed tows including a first removed tow and a second removed tow; and
the first removed tow spirally wrapped in one of the interior or the exterior of the braid in a first bias direction and the second removed tow spirally wrapped in one of the interior or the exterior of the braid in a second bias direction, the first bias direction being different than the second bias direction.

17. The braided sleeve of claim 9, further comprising:
the first portion further comprising the plurality of tows intertwined with one or more other tows of the plurality of tows in substantially a plurality of bias directions with respect to the longitudinal axis, the plurality of bias directions including a first bias direction and a second bias direction;
the second portion further comprising the remaining plurality of tows intertwined in the first bias direction and the second bias direction; and
the third portion further comprising the removed tow intertwined with the remaining plurality of tows in the first bias direction and the second bias direction.

18. The braided sleeve of claim 17, further comprising:
the second portion further comprising the removed tow being spirally wrapped in a fifth bias direction at one of a positive angle or a negative angle with respect to the longitudinal axis, the fifth bias direction being different than the first bias direction and the second bias direction.

* * * * *